United States Patent
Gould et al.

(10) Patent No.: US 9,926,410 B2
(45) Date of Patent: Mar. 27, 2018

(54) ORGANOSILOXANE COMPOSITIONS AND COATINGS, MANUFACTURED ARTICLES, METHODS AND USES

(71) Applicant: DOW CORNING CORPORATION, Midland, MI (US)

(72) Inventors: Graham Bailey Gould, Irvine, CA (US); Timothy Paul Mitchell, Clio, MI (US)

(73) Assignee: DOW CORNING CORPORATION, Midland, MI (US)

( * ) Notice: Subject to any disclaimer, the term of this patent is extended or adjusted under 35 U.S.C. 154(b) by 237 days.

(21) Appl. No.: 14/780,033

(22) PCT Filed: Mar. 28, 2014

(86) PCT No.: PCT/US2014/032247
§ 371 (c)(1),
(2) Date: Sep. 25, 2015

(87) PCT Pub. No.: WO2014/160975
PCT Pub. Date: Oct. 2, 2014

(65) Prior Publication Data
US 2016/0053056 A1 Feb. 25, 2016

Related U.S. Application Data

(60) Provisional application No. 61/806,056, filed on Mar. 28, 2013.

(51) Int. Cl.
| | | |
|---|---|---|
| C08G 77/44 | (2006.01) |
| C09D 183/10 | (2006.01) |
| C09J 7/02 | (2006.01) |
| C09D 183/04 | (2006.01) |
| C08G 77/12 | (2006.01) |
| C08G 77/16 | (2006.01) |
| C08G 77/20 | (2006.01) |
| C08G 77/00 | (2006.01) |

(52) U.S. Cl.
CPC ........... *C08G 77/44* (2013.01); *C09D 183/04* (2013.01); *C09D 183/10* (2013.01); *C09J 7/0228* (2013.01); *C08G 77/12* (2013.01); *C08G 77/16* (2013.01); *C08G 77/20* (2013.01); *C08G 77/70* (2013.01); *C09J 2483/005* (2013.01)

(58) Field of Classification Search
CPC ................................ C08G 77/16; C08G 77/38
See application file for complete search history.

(56) References Cited

U.S. PATENT DOCUMENTS

| | | |
|---|---|---|
| 3,419,593 A | 12/1968 | Willing |
| 4,766,176 A | 8/1988 | Lee et al. |
| 5,017,654 A | 5/1991 | Togashi et al. |
| 6,337,086 B1 | 1/2002 | Kanios et al. |
| 7,592,412 B2 | 9/2009 | Cray et al. |
| 7,846,550 B2 | 12/2010 | Marco Ooms et al. |
| 8,933,177 B2 * | 1/2015 | Hori ...................... C08G 77/44 428/447 |
| 9,212,262 B2 * | 12/2015 | Horstman ............... C08G 77/44 |
| 2003/0166818 A1 * | 9/2003 | Griswold ............... C09J 183/04 528/34 |
| 2005/0282977 A1 * | 12/2005 | Stempel ................ A61L 15/585 525/477 |
| 2008/0300358 A1 | 12/2008 | Cook et al. |
| 2009/0291238 A1 | 11/2009 | Scott et al. |

FOREIGN PATENT DOCUMENTS

| | | |
|---|---|---|
| JP | 2008013613 A | 1/2008 |
| WO | WO2010005113 A1 | 1/2010 |

OTHER PUBLICATIONS

International Search Report for PCT/US2014/032247, dated Jul. 17, 2014, 3 pages.
English language abstract and machine assisted English translation for JP2008-013613A extracted from https://www4.j-platpat.inpit.go.jp database on Sep. 21, 2015, 14 pages.

* cited by examiner

*Primary Examiner* — Marc S Zimmer
(74) *Attorney, Agent, or Firm* — Warner Norcross & Judd LLP

(57) ABSTRACT

A release-modifier composition comprises a capped polydiorganosiloxane-(MQ resin) copolymer, which comprises a macromolecule having an MQ resin portion covalently bonded to a polydiorganosiloxane portion. An M unit typically has the formula $R^1SiO_{1/2}$ and a Q unit typically has the formula $SiO_{4/2}$, wherein $R^1$ is an independently selected substituent. The polydiorganosiloxane portion comprises two D segments coupled to each other via a $(R^V,\text{Alkenyl})SiO_{2/2}$ unit, wherein $R^V$ is $(C_1-C_6)$hydrocarbyl. Alkenyl may be $(C_2-C_6)$alkenyl. Each D segment comprises two or more $(R^D)_2SiO_{2/2}$ units, which independently may be the same as or different than each other. Each $R^D$ independently may be $(C_1-C_6)$alkyl, $(C_3-C_6)$cycloalkyl, or phenyl. A curable release-coating composition comprising or prepared from the release-modifier composition, cured release-coating composition, coatings comprising the same, manufactured articles, kits, methods and uses, are also disclosed.

17 Claims, No Drawings

ORGANOSILOXANE COMPOSITIONS AND COATINGS, MANUFACTURED ARTICLES, METHODS AND USES

CROSS-REFERENCE TO RELATED APPLICATIONS

This application is the National Stage of International Application No. PCT/US2014/032247, filed on Mar. 28, 2014, which claims priority to and all advantages of U.S. Patent Application No. 61/806,056, filed on Mar. 28, 2013, the content of which is hereby incorporated by reference.

BACKGROUND

Release modifiers generally have been used in a variety of coating applications in the construction, paper, textile, and wood industries. For example, see JP 2008-013613 A; WO 2010/005113 A1; and U.S. Pat. No. 7,846,550 B2.

BRIEF SUMMARY OF THE INVENTION

This invention comprises organosiloxane compositions and coatings, manufactured articles, methods and uses. Embodiments of the invention include the following.

A release-modifier composition comprising a capped polydiorganosiloxane-(MQ resin) copolymer, which is prepared by capping a HO-functional polydiorganosiloxane-(MQ resin) copolymer, wherein the capped polydiorganosiloxane-(MQ resin) copolymer has a hydroxyl content of less than 13,000 parts per million (ppm); and wherein the HO-functional polydiorganosiloxane-(MQ resin) copolymer comprises a macromolecule having an MQ resin portion covalently bonded to a designed polydiorganosiloxane portion; wherein the polydiorganosiloxane portion comprises two D segments coupled to each other via a $(R^V,\text{Alkenyl})\text{SiO}_{2/2}$ unit, wherein the D segments lack carbon-carbon double and triple bonds; and wherein the $R^V$, Alkenyl, and D segments are as defined later.

A curable release-coating composition comprising a mixture of at least the release-modifier composition, an alkenyl-containing diorganosiloxane, an organohydrogensiloxane, and a hydrosilylation catalyst.

A cured release-coating composition comprising a product of hydrosilylation curing the curable release-coating composition.

A coated article comprising a substrate and the cured release-coating composition in operative contact therewith.

A composite article comprising a first substrate, an adhesive, the cured release-coating composition, and a second substrate.

A kit comprising the composite article and instructions for using the composite article.

A method of making the HO-functional polydiorganosiloxane-(MQ resin) copolymer.

A method of making the capped polydiorganosiloxane-(MQ resin) copolymer.

A method of making the release-modifier composition.

A method of making the curable release-coating composition.

A method of making the cured release-coating composition.

A method of making the coated article.

A method of making the composite article.

The HO-functional polydiorganosiloxane-(MQ resin) copolymer is useful at least for making the capped polydiorganosiloxane-(MQ resin) copolymer, which is useful in the release-modifier and curable release-coating compositions. The release-modifier composition is useful in the curable release-coating composition, which upon curing yields the cured release-coating composition. The compositions are useful in release modifier and coating applications. The foregoing embodiments may have other uses and applications, including those unrelated to release modification and coating uses and applications.

DETAILED DESCRIPTION OF THE INVENTION

The Brief Summary and Abstract are incorporated here by reference. The invention embodiments include the release-modifier composition; the curable release-coating composition; the cured release-coating composition; the kit; the coated article; the composite article; and the methods of making the compositions, kit, and articles. The cured release-coating composition may be prepared from the curable release-coating composition, which may be prepared from the release-modifier composition, which may be prepared from the capped polydiorganosiloxane-(MQ resin) copolymer, which may be prepared from the HO-functional polydiorganosiloxane-(MQ resin) copolymer according to step (iii) as described later, which may be prepared from MQ resin and a designed polydiorganosiloxane precursor according to step (ii) as described later, which may be prepared from reactants (a1) and (a2) according to step (i) as described later. The kit and articles may be prepared from any one of the invention compositions. The invention embodiments also independently include the embodiments and examples of the HO-functional polydiorganosiloxane-(MQ resin) copolymer and the capped polydiorganosiloxane-(MQ resin) copolymer described later.

To lack means to be free of. For example, when it is said "the D segments lack carbon-carbon double and triple bonds", it means that such expression can be changed by "the D segments are free of carbon-carbon double and triple bonds".

A hydrosilylation catalyst is usually a Pt Catalyst. Therefore an hydrosilylation catalyst is often called a "Pt catalyst".

Silanes and siloxanes are compounds containing silicon.

A silane is a compound typically derived from SiH4. A silane often contains at least one Si—C bond. A silane usually contains only one Si atom.

A siloxane is a compound which contains at least one Si—O bond.

A polysiloxane contains several Si—O—Si— bonds forming a polymeric chain, where the repeating unit is —(Si—O)—. An organopolysiloxane is sometimes called a silicone. An organopolysiloxane contains repeating —(Si—O)— units where at least one Si atom bears at least one organic group. "Organic" means containing at least one carbon atom. An organic group is a chemical group comprising at least one carbon atom.

A polysiloxane comprises terminal groups and pendant groups. A terminal group is a chemical group located on a Si atom which is at an end of the polymer chain. A pendant group is a group located on a Si atom which Si atom is within the polymeric chain, i.e. not at the end of the polymeric chain.

A polysiloxane can be a polysiloxane comprising at least one of the following units: M unit (mono-functional), D unit (di-functional), T unit (tri-functional), Q unit (tetrafunctional). The Si atom of a M unit is bonded to 1 O atom. The Si atom of a D unit is bonded to 2 O atoms. The Si atom of a T unit is bonded to 3 O atoms. The Si atom of a Q unit is bonded to 4 O atoms.

A M unit typically has the formula $R^1SiO_{1/2}$. A D unit typically has the formula $R^2R^3SiO_{2/2}$. A T unit has the formula $R^4SiO_{3/2}$. A Q unit typically has the formula $SiO_{4/2}$.

$R^1$, $R^2$, $R^3$, $R^4$ are each a substituent, preferably an organic substituent. Each substituent $R^1$, $R^2$, $R^3$ or $R^4$ can be selected for example from alkyl, aryl, alkenyl, acrylate, methacrylate and others. For example it can be an alkenyl group having 2 to 6 carbon atoms, for example a vinyl group or a hexenyl group.

A branched polysiloxane sometimes called a resin typically contains at least one T unit and/or at least one Q unit. A linear polysiloxane typically contains D units and optionally M units. An MQ resin is an organopolysiloxane containing at least one M unit and at least one Q unit.

A polymer is a compound containing repeating units which units typically form at least one polymeric chain. A polymer can be a homopolymer of a copolymer. A homopolymer is a polymer which is formed from only one type of monomer. A copolymer is a polymer formed from at least two monomers. In a random copolymer, the different repeating units are dispersed randomly in the copolymer. In a non-random copolymer, the repeating units are not dispersed randomly. For example a non-random copolymer can be a block copolymer or sequential copolymer.

A polymer is called an organic polymer when the repeating units contain carbon atoms.

In a condensation reaction, two molecules combine with the loss of a smaller molecule, such as, for example, water, an alcohol or an acid. In an addition reaction, two or more molecules combine to form a larger one, without the loss of a molecule. Addition reactions in organic chemistry relates to organic compounds that have multiple bonds, such as, for example, compounds with carbon-carbon double bonds (alkenes), or with triple bonds (alkynes), or carbon-hetero double bonds like carbonyl (C=O) groups or imine (C=N) groups.

Some polymers are thermoset: once cooled and hardened, these polymers retain their shapes and cannot return to their original form. Other polymers are thermoplastics: they can soften upon heating and return to their original form.

A functional group is a chemical group having a function, for example a reactive group.

A capping or end-capping reaction is a reaction where a functional group is changed or removed. A capping reaction can be conducted at the end of a polymerization reaction, to neutralize at least partly the remaining functional, reactive groups that can be present on the surface of the polymer. For example some or all of remaining functional, reactive groups such as, for example silanol or alkenyl groups, present at the surface of a macromolecule can be removed in a capping reaction. Another functional group can be introduced by a capping reaction.

A macromolecule is a molecule of important size. A polymer is a macromolecule. The term "SiH" is used to designate a chemical group containing at least one Si—H bond.

The word silanol is used to designate a functional group with the connectivity Si—O—H. A silanol is an —OH functional silicon-containing group.

Hydrosilylation is an addition reaction where a compound containing at least one unsaturated bond reacts with a compound containing at least one Si—H bond.

An unsaturated bond is a bond comprising a double or triple liaison between two atoms. The bonded atoms may be both carbon atoms or carbon-heteroatom. For example an unsaturated bond can be alkenyl.

A cross linking reaction is a reaction where two or more molecules, at least one of them being a polymer, are joined together to harden or cure the polymer. A cross linker is a compound able to produce a crosslinking reaction of a polymer.

This invention relates to curable silicone release coating compositions. Silicone based release coatings are useful in applications where relatively non-adhesive surfaces are required. A curable silicone release coating composition is applied to a substrate known as a 'liner', which can for example be paper or a polymer film, and cured. Single-sided liners, for example, backing sheets for pressure sensitive adhesive labels, are used to temporarily retain the labels without affecting the adhesive properties of the labels. Double-sided liners, for example interleaving papers for double-sided and transfer tapes, are used to ensure the protection and desired unwind characteristics of a double-sided self-adhesive tape or adhesive film. The release coating is required to adhere well to the liner while having relatively low adhesion to the adhesive so that the label can be removed from the liner by a predetermined peel force.

A liner substrate is coated by applying a silicone based release coating composition onto the substrate and subsequently curing the composition. The preferred curing mechanism is thermally initiated hydrosilylation, which can be modified to vary the adhesive force between the release coating and the adhesive label. The basic constituents of silicone based release coating compositions which are cured by hydrosilylation are (A) a polyorganosiloxane containing alkenyl groups, (B) a cross-linking agent (also called crosslinker) containing organohydrogensiloxane groups and a catalyst for the hydrosilylation reaction between (A) and (B).

The liner substrate can be paper or polymer substrate such as polyester, for example polyethylene terephthalate, film, polypropylene or polyethylene, particularly for clear on clear labels.

The present invention is directed to, among others, release modifier compositions which are added to a release coating composition to modify the release coating composition.

As used herein, "may" confers a choice, not an imperative. "Optionally" means is absent, alternatively is present. "Contacting" reactants together means bringing the reactants into chemical reaction with each other under effective reaction conditions. "Operative contact" comprises functionally effective touching, e.g., as for modifying, coating, adhering, sealing, or filling. The operative contact may be direct physical touching, alternatively indirect touching. All U.S. patent application publications and patents referenced herein, or a portion thereof if only the portion is referenced, are hereby incorporated herein by reference to the extent that incorporated subject matter does not conflict with the present description, which would control in any such conflict. The term "vehicle" means a liquid having a boiling point of from 30 to 150 degrees Celsius (° C.) at 101 kilopascals. Should an embodiment of the invention contain a first type of ingredient and lack a second type of ingredient, wherein the first and second types of ingredients may inadvertently not be mutually exclusive but overlap in structure, it is the lacking, not the containing, limitation which controls. For example, where the invention contains an organic vehicle and lacks a hydrosilylation reactive diluent (e.g., alkene), the organic vehicle lacks unsaturated hydrocarbon. All "wt %" (weight percent) are, unless otherwise noted, based on total weight of all ingredients used to make the composition, which adds up to 100 wt %. "Curable amount" is a quantity sufficient and used for producing a cured material. Any Markush group comprising a genus and subgenus therein includes the subgenus in the genus, e.g., in Markush group "R is hydrocarbyl or alkenyl," R may be alkenyl, alternatively R may be hydrocarbyl, which includes, among other subgenera, alkenyl. A "non-invention" aspect does not mean prior art aspect; any non-invention aspect independently may, alternatively may not be prior art. All viscosities are conducted at 25° C. unless otherwise noted. Terms of the general format "organopolysiloxane" and terms of the general format "polyorganosiloxane" may be used interchangeably herein. The HO-functional polydiorganosiloxane-(MQ resin) copolymer and the capped polydiorganosiloxane-(MQ resin) copolymer may be collectively referred to herein as the invention polydiorganosiloxane-(MQ resin) copolymers. The term "extractables" means the amount of uncured material remaining after curing in a cured release coating composition, wherein the uncured material is that which is dissolvable in a suitable solvent and thereby removable from the cured release coating composition. The term "release force" means the energy required to delaminate an adhesive tape or other construction from a cured release coating composition. The term "release force efficiency" means the degree or magnitude that the release force increases with incremental increases in loading level of a curable release modifier composition in a curable release coating composition. The higher release force efficiency of a given curable release modifier composition, the lower the concentration of the curable release modifier composition that is needed in a curable release coating composition to eventually give a cured release coating composition having a given release force. The term "release-modifier" is abbreviated RM herein and "release-coating" RC herein. The RM composition, curable RC composition, and cured RC composition may be collectively referred to herein as invention compositions. The term "substantially the same" means at least 90%, alternatively at least 95%, alternatively at least 98%, but less than 100% identical. The term "SiH" may also be shown as Si—H.

This invention solves some of the problems discovered for prior art RM and RC compositions that do not achieve higher cure rates and/or decrease extractables without loss of release force or release force efficiency. For example, certain non-invention silicone-based RM compositions might desirably increase cure rates and/or decrease extractables obtainable from non-invention RC compositions containing the same, but they also undesirably lose release force or release force efficiency. The non-invention silicone-based RC compositions may also require higher levels of Pt catalyst to preserve a given amount of anchorage. In contrast, the RM and RC compositions of this invention desirably achieve higher cure rates and/or decrease extractables without loss, or with insignificant loss, of release force or release force efficiency. This means the invention compositions may perform better as release modifiers and release coatings than comparative non-invention ones. Further, at least some embodiments of the invention may employ less Pt catalyst in the curable RC composition and still preserve a given amount of anchorage. This means the invention cured RC composition may achieve a targeted amount of anchorage for a particular application (e.g., labeling) with a lesser amount of Pt catalyst, thereby improving cost competitiveness and lessening environmental impact (e.g., Pt mining and disposal) compared to the comparative non-invention ones. Certain aspects of this invention may independently solve additional problems and/or have other advantages.

Based on currently available test data, the inventors believe the invention solution may be related at least in part to the designed structure of the invention polydiorganosiloxane-(MQ resin) copolymers. Alternative or additional reasons may be responsible, however.

The designed structures of the invention polydiorganosiloxane-(MQ resin) copolymers may be associated with the structure of their designed polydiorganosiloxane portion(s), which in turn may be a result of how the designed polydiorganosiloxane portion is synthesized. Each of the invention polydiorganosiloxane-(MQ resin) copolymers independently comprises at least one, alternatively a plurality of designed macromolecules. Each designed macromolecule of the HO-functional polydiorganosiloxane-(MQ resin) copolymer independently may be the same as or different than another designed macromolecule of the HO-functional polydiorganosiloxane-(MQ resin) copolymer, and typically is characterizable as being an atactic macromolecule. Each designed macromolecule of the capped polydiorganosiloxane-(MQ resin) copolymer independently may be the same as or different than another designed macromolecule of the capped polydiorganosiloxane-(MQ resin) copolymer, and typically is characterizable as being an atactic macromolecule. The capped polydiorganosiloxane-(MQ resin) copolymer may further comprise macromolecules of the unreacted HO-functional polydiorganosiloxane-(MQ resin) copolymer.

Each of the designed macromolecules of the invention polydiorganosiloxane-(MQ resin) copolymers independently comprises a designed polydiorganosiloxane portion and a MQ resin portion, alternatively a designed polydiorganosiloxane portion and two MQ resin portions, alternatively two or more designed polydiorganosiloxane portion and two or more MQ resin portions. The invention contemplates additional combinations of designed polydiorganosiloxane portions and MQ resin portions in a macromolecule. Typically at least one, alternatively each designed polydiorganosiloxane portion is covalently bonded at its distal ends (alpha, omega ends) to different ones of two MQ resin portions. The designed polydiorganosiloxane portion comprises two D segments coupled to each other via a linking $(R^V,\text{Alkenyl})\text{SiO}_{2/2}$ unit, wherein $R^V$ is $(C_1\text{-}C_6)$hydrocarbyl and the D segments lack carbon-carbon double and triple bonds. In a given designed polydiorganosiloxane portion, there independently may be 2 or more D segments, alternatively 2, alternatively 3, alternatively 4, alternatively 5, alternatively 6 or more D segments, Each D segment comprises a plurality of D repeat units i.e., two or more $(R^D)_2\text{SiO}_{2/2}$ units, which independently may be the same as, alternatively different than, each other. Each $R^D$ independently may be $(C_1\text{-}C_6)$alkyl, $(C_3\text{-}C_6)$cycloalkyl, or phenyl. Typically the plurality of D repeat units in a given D segment are the same, i.e., each D unit has the same two $R^D$ groups as another D unit. Nevertheless, one $R^D$ group in a given D unit may be different than the other $R^D$ group in the same D unit (e.g., as in a $(CH_3)(CH_3CH_2)\text{SiO}_{2/2}$ or $(CH_3)$(phenyl)$\text{SiO}_{2/2}$ D unit), although more typically each $R^D$ group in a given D unit is the same, e.g., as in a D segment consisting of a plurality of $(CH_3)_2\text{SiO}_{2/2}$ D units. Thus, the $(R^V,\text{Alkenyl})\text{SiO}_{2/2}$ unit is beneficially spaced apart from the distal ends of the designed polydiorganosiloxane portion by the D segments, i.e., a plurality of D units. Since the distal ends of the designed polydiorganosiloxane portion form the covalent bonds to the MQ resin portions in the invention polydiorganosiloxane-(MQ resin) copolymers and the $(R^V,\text{Alkenyl})\text{SiO}_{2/2}$ unit is beneficially spaced apart from the distal ends of the designed polydiorganosiloxane portion, the ($R^V$,Alkenyl)SiO$_{2/2}$ unit is beneficially spaced apart from the MQ resin portions in the invention polydiorganosiloxane-(MQ resin) copolymers. The plurality of the designed macromolecules of the invention polydiorganosiloxane-(MQ resin) copolymers may be characterizable by an average structure containing a greater proportion of ($R^V$,Alkenyl)SiO$_{2/2}$ units spaced apart from the MQ resin portions than would be achievable if the distribution of the ($R^V$, Alkenyl)SiO$_{2/2}$ units in a non-invention polydiorganosiloxane portion was random. Thus, the RM and curable RC compositions may be characterizable as being enriched in the invention designed macromolecules of the capped polydiorganosiloxane-(MQ resin) copolymer and the cured RC composition may be characterizable as being enriched in derivatives prepared by curing the curable RC composition.

The backbone part of the designed polydiorganosiloxane portion of the HO-functional polydiorganosiloxane-(MQ resin) copolymer typically is structurally the same as that of the backbone part of the designed polydiorganosiloxane portion of the capped polydiorganosiloxane-(MQ resin) copolymer. The hydroxyl contents of the designed polydiorganosiloxane portions may be different, the same, or substantially the same.

Each designed polydiorganosiloxane portion of the invention polydiorganosiloxane-(MQ resin) copolymers independently is designed by virtue of how it is synthesized. In order to achieve the design of the designed polydiorganosiloxane portion, and thus the design of the invention polydiorganosiloxane-(MQ resin) copolymer macromolecules, the designed polydiorganosiloxane portion of the invention polydiorganosiloxane-(MQ resin) copolymers is prepared via a non-random, non-equilibration process. Any such a non-random, non-equilibration process may be used. An example of such a process comprises the coupling, and essentially chain extending, two polydiorganosiloxane D segments via the ($R^V$,Alkenyl)SiO$_{2/2}$ unit. This example is described in more detail later. The non-random, non-equilibration process ensures that the invention polydiorganosiloxane-(MQ resin) copolymers are independently enriched with the plurality of their designed macromolecules.

In contrast, preparing a polydiorganosiloxane portion via an equilibration method such as a process wherein a mixture of condensation polymerizable monomers comprising, for example, ($R^V$,Alkenyl)SiCl$_2$ monomers and ($R^D$)$_2$SiCl$_2$ monomers, would inevitably yield a non-invention random polydiorganosiloxane portion having a random distribution of ($R^V$,Alkenyl)SiO$_{2/2}$ units therein. Condensing the random polydiorganosiloxane portion with an MQ resin would give a non-invention random distribution-based copolymer. For ease of distinction only, the invention copolymer is referred to as "polydiorganosiloxane-(MQ resin) copolymer" whereas the comparative non-invention copolymer is referred to as "non-invention random copolymer" herein. The non-invention random copolymer prepared from the random polydiorganosiloxane would be characterizable as not being enriched in the invention designed macromolecules and would have an average structure that is derived from the random distribution of ($R^V$,Alkenyl)SiO$_{2/2}$ units and consequently different than the average structure of the invention polydiorganosiloxane-(MQ resin) copolymers. Reiterated, the invention polydiorganosiloxane-(MQ resin) copolymers independently are significantly enriched in their designed macromolecules compared to a non-invention plurality of non-invention random copolymer macromolecules that would be prepared by the equilibration method. Therefore, the average structures of the plurality of the designed macromolecules of the invention polydiorganosiloxane-(MQ resin) copolymers are significantly different than the average structure of the non-invention plurality of non-invention random copolymer macromolecules that would be prepared via the equilibration method.

Based on currently available test data (shown later), the inventors believe the improved performance of the invention compositions results from a beneficial combination of at least the following three improved functions: increased % anchorage, decreased % extractables, and increased release force or release force efficiency. This combination of benefits may be related at least in part to the unique design of the structure of the capped polydiorganosiloxane-(MQ resin) copolymer. Typically, an additional benefit of the present invention is improved compatibility with additives such as anchorage additives and/or hydrosilylation reaction inhibitors as described later. In some embodiments, the invention (e.g., the curable RC composition) has the combination of three improved functions. In other embodiments the curable RC composition further comprises an anchorage additive, hydrosilylation reaction inhibitor, or both, and the invention has the combination of three improved functions plus improved compatibility with the anchorage additive, alternatively the hydrosilylation reaction inhibitor, alternatively both the anchorage additive and the hydrosilylation reaction inhibitor. The anchorage additive and hydrosilylation reaction inhibitor independently may be chosen to be a compound or material wherein use of which is in need of the improved compatibility, and such that the improved compatibility of these other embodiments can be demonstrated. The designed macromolecules of the capped polydiorganosiloxane-(MQ resin) copolymer, and thus the copolymer itself and invention compositions comprising same or prepared from the same such as by curing, achieve unexpected performance benefits over any equilibration-prepared, comparative non-invention compositions containing the non-invention random copolymer. In this invention the capped polydiorganosiloxane-(MQ resin) copolymer beneficially decreases extractables of RC compositions comprising same without loss, or with insignificant loss, of release force or release force efficiency of the RC compositions. This particular benefit of the invention may be demonstrated in any suitable manner. For example, the ad rem invention benefit may be demonstrated by comparing extractables, anchorage and release force or release force efficiencies of the invention compositions to those of non-invention comparative compositions comprising the non-invention random copolymer having the random (un-enriched) or equilibration-based distribution of alkenyl moieties in a (random) polydiorganosiloxane portion. The "polydiorganosiloxane precursor" is hereafter called a "designed polydiorganosiloxane precursor" because its formulation is designed by the reaction herein defined. Similarly, a "polydiorganosiloxane portion" can also be called a "designed polydiorganosiloxane portion" when obtained by the reaction herein defined.

In the present invention the particular loading of the curable RM composition in the curable RC composition and the particular release force test method used to determine release force and release force efficiency of the cured RC composition generally are not critical. For comparison purposes, however, the release force and release force efficiency of the invention compositions may be determined at a particular loading of curable RM composition in the curable RC composition and using a particular release force test method. The "loading" means concentration of the curable RM composition (ingredient (a)) in the curable RC composition based on total weight of ingredients (a) to (c) of the curable RC composition. That is, it may be informative to compare functional performances of different compositions, including invention and non-invention compositions, using data generated at a same loading level with a same release force test method.

For example, for comparison purposes the invention compositions may be characterized by % Extractables; % Anchorage; and release force as indicated by FINAT Test Method (FTM) 3-Release at 0.3 m/min with Acronal V210>10.0 g/2.54 cm, all according to the test methods described later; wherein the compositions have a loading of the curable RM composition of 30 wt % in the curable RC composition based on total weight of the ingredients (a) to (c) of the curable RC composition. Embodiments of the invention compositions characterized in this way may show a superior combination of % Extractables <7.00%; % Anchorage >90.1%; and release force as indicated by FTM 3-Release at 0.3 m/min with Acronal V210>10.0 g/2.54 cm. Alternatively, the % Extractables may be <6.90%, alternatively <6.70%, alternatively <6.50%, alternatively <6.30%, alternatively <5 wt %; and >3.0%, alternatively >4%. Alternatively, the % Anchorage may be >90.5%, alternatively >91%, alternatively >94%, alternatively >95% alternatively >96%. Alternatively, the FTM 3-Release at 0.3 m/min with Acronal V210 may be >10.5 g/2.54 cm, alternatively >11.0 g/2.54 cm, alternatively >12.0 g/2.54 cm, alternatively >12.3 g/2.54 cm, alternatively >12.6 g/2.54 cm, alternatively >12.9 g/2.54 cm, alternatively >13.0 g/2.54 cm, alternatively >13.6.0 g/2.54 cm. The superior combination of % Extractables, % Anchorage and release force may be based on the data obtained with the Examples described later. For example, the % Extractables may be <6.90%, the % Anchorage may be >96.0%, and the FTM 3-Release at 0.3 m/min with Acronal V210 may be >12.9 g/2.54 cm. Alternatively, the % Extractables may be <6.50%, the % Anchorage may be >96.0%, and the FTM 3-Release at 0.3 m/min with Acronal V210 may be >12.5 g/2.54 cm. Alternatively, the % Extractables may be <6.30%, the % Anchorage may be >94.0%, and the FTM 3-Release at 0.3 m/min with Acronal V210 may be >12.3 g/2.54 cm. Alternatively, the % Extractables may be <6.70%, the % Anchorage may be >90.5%, and the FTM 3-Release at 0.3 m/min with Acronal V210 may be >13.9 g/2.54 cm. If desired, release force as indicated by any one of the FTM 4-Release methods described later may be used in place of the FTM 3-Release test method, which methods are promulgated by FINAT, The Hague, The Netherlands.

While the capped polydiorganosiloxane-(MQ resin) copolymer and RM composition and curable RC composition comprising the capped polydiorganosiloxane-(MQ resin) copolymer are enriched in the designed macromolecules, the invention compositions may in some embodiments further contain the non-invention random copolymer having the random (un-enriched) or equilibration-based distribution of $(R^V,Alkenyl)SiO_{2/2}$ units in a (random) polydiorganosiloxane portion. For example, a non-invention random copolymer may be prepared separately via the aforementioned equilibration process, and then mixed with the invention capped polydiorganosiloxane-(MQ resin) copolymer and/or one of the RM and curable RC compositions. The non-invention random copolymer may be used in the RM and curable RC compositions as a hydrosilylation reactive diluent. Alternatively or additionally, it might be used for cost reasons if the non-invention random copolymer would be less expensive to prepare than the invention capped polydiorganosiloxane-(MQ resin) copolymer. In the invention, however, the proportion, if any, of the non-invention random copolymers in the curable invention compositions would not be set so high as to negative at least one of the advantages of the invention compositions. The curable invention compositions typically lack the non-invention random copolymer.

The designed polydiorganosiloxane portions of the invention polydiorganosiloxane-(MQ resin) copolymers independently are derived from a designed polydiorganosiloxane precursor that is a condensation reaction product of step (i), which comprises a condensation reaction. Step (i) comprises contacting together at least reactants (a1) and (a2), wherein the contacting gives the designed polydiorganosiloxane precursor. The designed polydiorganosiloxane precursor is a precursor to the polydiorganosiloxane portion of the capped polydiorganosiloxane-(MQ resin) copolymer.

Reactant (a1) is a di($R^L$O-endblocked)-polydiorganosiloxane polymer having a degree of polymerization (DP) of from 300 to 2,000 and lacking carbon-carbon double and triple bonds. The di($R^L$O-endblocked)-polydiorganosiloxane polymer comprises $R^L O(R^M)_2 SiO_{1/2}$ end-units (M units) having hydroxy and/or alkoxy end-groups (i.e., the $R^L$O-endblocks) and a plurality of $(R^D)_2 SiO_{2/2}$ units (D units) lacking both carbon-carbon double and triple bonds. Each $R^M$ and $R^D$ independently is $(C_1-C_6)$alkyl, $(C_3-C_6)$cycloalkyl, or phenyl. Each $R^L$ independently is hydrogen or $(C_1-C_6)$alkyl. When $R^L$ is $(C_1-C_6)$alkyl, the step (i) may further comprise an amount of water sufficient to generate di(HO-endblocked)-polydiorganosiloxane polymer comprising $HO(R^M)_2 SiO_{1/2}$ end-units (M units) in situ. The di($R^L$O-endblocked)-polydiorganosiloxane polymer may be the di($C_1-C_6$)alkylO-endblocked)-polydiorganosiloxane polymer, alternatively the di(HO-endblocked)-polydiorganosiloxane polymer. The di($C_1-C_6$)alkylO-endblocked)-polydiorganosiloxane polymer may be a di(MethylO-endblocked)-polydiorganosiloxane polymer. The DP of the di($R^L$O-endblocked)-polydiorganosiloxane polymer such as the di(HO-endblocked)-polydiorganosiloxane polymer may be DP 300 to 2,000. Alternatively or additionally, the di($R^L$O-endblocked)-polydiorganosiloxane polymer such as the di(HO-endblocked)-polydiorganosiloxane polymer may have a weight average molecular weight ($M_w$) of from 30,000 to 250,000 grams per mole (g/mol), alternatively from 35,000 to 190,000 g/mol, alternatively from 40,000 to 150,000 g/mol.

Reactant (a1) may be a straight-chain diorganopolysiloxane that has two hydroxyl groups in both molecular chain terminals and that is represented by the following structural formula

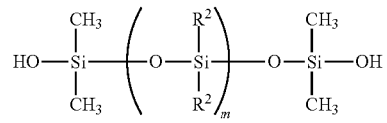

wherein in the formula, m is a number from 300 to 2,000; and each $R^2$ independently is a hydroxy, $(C_1-C_6)$alkoxy, or $(C_1-C_6)$hydrocarbyl, wherein the $(C_1-C_6)$hydrocarbyl may be substituted, alternatively unsubstituted (i.e., consist of H and C atoms) and that does not contain a carbon-carbon double or triple bond. The substituents of the substituted $(C_1-C_6)$hydrocarbyl may be F, Cl, Br, I, or $C_1-C_6$)alkoxy. Examples of substituted $(C_1-C_6)$hydrocarbyl are trifluoromethyl, 4-chlorophenyl, fluoromethoxy, and 2-methoxyethyl. Each $R^2$ independently may be the hydroxy, methoxy, methyl, or phenyl; alternatively methyl or phenyl, alternatively methyl.

Reactant (a2) is an alkenyl-containing coupling agent of formula $(R^V,\text{Alkenyl})Si(X)_2$. $R^V$ is $(C_1\text{-}C_6)$hydrocarbyl. Alkenyl is $(C_2\text{-}C_6)$alkenyl. Each X independently is a condensation reaction leaving group. The designed polydiorganosiloxane precursor is formed by the condensation reaction. The leaving group X is displaceable by water and/or a hydroxy of an Si—OH moiety during the condensation reaction of step (i). Each X independently may be a halogen atom, $(C_1\text{-}C_6)$alkoxy (i.e., $(C_1\text{-}C_6)$alkyl-O—), $R^1R^2C=N-O-$, or $R^1C(O)N(RN)-$. Each $R^1$, $R^2$, and RN independently is $(C_1\text{-}C_6)$hydrocarbyl. The $R^1C(O)N(RN)-$ may be N-ethylacetamido, alternatively N-methylacetamido. The alkenyl-containing coupling agent of formula $(R^V,\text{Alkenyl})Si(X)_2$ may be $(CH_3,\text{vinyl})Si[N(CH_2CH_3)(C(O)CH_3)]_2$.

In step (i) reactants (a1) and (a2) are contacted together such that they condense to give the designed polydiorganosiloxane precursor having an alkenyl group content of from 0.01 to 10 mole percent. The designed polydiorganosiloxane precursor may further have a degree of polymerization (DP) of from 500 to 4,400. The condensation reaction of step (i) may further use, alternatively may not further use, a separately added ingredient that functions as a condensation reaction catalyst. The designed polydiorganosiloxane precursor is used in step (ii) as a precursor for the designed polydiorganosiloxane portion of the HO-functional polydiorganosiloxane-(MQ resin) copolymer. Use of the designed polydiorganosiloxane precursor gives the curable RM composition having alkenyl content and designed alkenyl location that ultimately leads to an improvement in % extractables for the cured RC composition prepared therefrom compared to % extractables for a non-invention cured composition lacking the alkenyl content or having the alkenyl content and random alkenyl location.

Step (i) may be carried out by dissolving the reactants (a1) and (a2) in a desired weight ratio thereof in an organic vehicle, mixing to homogeneity, and then optionally adding an effective amount of the separately added ingredient that functions as a condensation reaction catalyst. Then stirring the resulting reaction mixture at a suitable reaction temperature and for a suitable reaction period gives a reaction mixture comprising the designed polydiorganosiloxane precursor as a reaction product. The reaction temperature may be any degree of hotness or coldness sufficient to allow the reaction of step (i) to occur under the conditions and may be, for example from 20° to 90° C., alternatively from 20° to 80° C., alternatively from 25° to 80° C. The reaction period may be any length of time sufficient to allow the reaction of step (i) to occur under the conditions and may be, for example, from 30 minutes to 24 hours, alternatively from 45 minutes to 15 hours, alternatively from 1 to 10 hours. If desired, once the condensation reaction has prepared the designed polydiorganosiloxane precursor, volatiles such as water, organic vehicle and any volatile optional condensation reaction catalyst may be removed from the reaction mixture by any suitable means such as stripping, evaporation or distillation to give a more concentrated form of the designed polydiorganosiloxane precursor, which may then be used directly in step (ii).

The alkenyl of the designed polydiorganosiloxane may be vinyl, allyl, or hexenyl. In the designed polydiorganosiloxane precursor, each Alkenyl may be vinyl and the DP may be from 500 to 4,400 and a vinyl group content of from 0.01 to 10 mole percent. The vinyl content of the designed polydiorganosiloxane precursor may be from 0.01 to 0.094 mole percent; alternatively from 0.105 to 10 mole percent; alternatively from 0.16 to 1.0 mole percent. The DP of the designed polydiorganosiloxane precursor may be from 580 to 2,700, alternatively from 590 to 2,200. For example, when DP4,000, examples of the designed polydiorganosiloxane precursor may have a vinyl content of 0.01, 0.11, 0.15, 0.22, 0.30 or 0.85.

The HO-functional polydiorganosiloxane-(MQ resin) copolymer is a product of a process comprising the following step (ii), alternatively the steps (i) and (ii). Step (i) is as described above. Step (ii) comprises a condensation reaction. Step (ii) comprises contacting together at least the designed polydiorganosiloxane precursor, whether prepared as described above in step (i) or by a different non-equilibration method, and a polyorganosiloxane MQ resin in contact with a condensation reaction catalyst to give the HO-functional polydiorganosiloxane-(MQ resin) copolymer.

Step (ii) may be carried out by dissolving the designed polydiorganosiloxane precursor and polyorganosiloxane MQ resin in a desired weight ratio thereof in an organic vehicle, mixing to homogeneity, and then adding an effective amount of the condensation reaction catalyst, and stirring the resulting reaction mixture at a suitable reaction temperature and for a suitable reaction period to give a reaction mixture comprising the HO-functional polydiorganosiloxane-(MQ resin) copolymer as a reaction product. The reaction temperature may be any degree of hotness or coldness sufficient to allow the reaction of step (ii) to occur under the conditions and may be, for example from 20° to 200° C., alternatively from 30° to 150° C., alternatively from 50° to 150° C., alternatively from 70° to 140° C. The reaction period may be any length of time sufficient to allow the reaction of step (ii) to occur under the conditions and may be, for example, from 30 minutes to 24 hours, alternatively from 45 minutes to 15 hours, alternatively from 1 to 10 hours. If desired, once the condensation reaction has prepared the HO-functional polydiorganosiloxane-(MQ resin) copolymer, volatiles such as water, organic vehicle and any volatile condensation reaction catalyst may be removed from the reaction mixture by any suitable means such as stripping, evaporation or distillation to give a more concentrated form of the HO-functional polydiorganosiloxane-(MQ resin) copolymer, which may then be used directly in step (iii).

The polyorganosiloxane MQ resin comprises M and Q units and has a total silicon-hydroxy group (Si—OH) content of from 1.0 to 3.0 wt %, alternatively 1.1 to 2.9 wt %. Weight percent Si—OH content is measured by $^{29}$Si nuclear magnetic resonance spectroscopy. The M units of the polyorganosiloxane MQ resin may comprise $R^XO(R^M)_2SiO_{1/2}$ end-units (M units) having hydroxy and/or alkoxy end-groups, wherein $R^X$ is H or $(C_1\text{-}C_6)$hydrocarbyl, alternatively H or $(C_1\text{-}C_6)$alkyl, alternatively H or $(C_1\text{-}C_2)$alkyl, alternatively $CH_3$, alternatively H; and each $R^M$ independently is as defined above. The Q units of the polyorganosiloxane MQ resin may comprise $SiO_{4/2}$ units. For example, when $R^X$ is H, the M units of the polyorganosiloxane MQ resin may comprise $HO(CH_3CH_2)_2SiO_{1/2}$ end-units, alternatively $HO(CH_3)(\text{phenyl})SiO_{1/2}$ end-units, alternatively $HO(CH_3)_2SiO_{1/2}$ end-units (M units). The molar ratio of M to Q units (i.e., the M/Q molar ratio) in the polyorganosiloxane MQ resin may be from 0.60 to 1.0, alternatively from 0.60 to 0.80, alternatively from 0.80 to 1.00. While a majority of the units in the polyorganosiloxane MQ resin are M and Q units, the polyorganosiloxane MQ resin may further comprise D and/or T units. Known symbols M, D, T, and Q, represent the different functionality of structural units that may be present in a siloxane (i.e., silicone), which comprises siloxane units joined by covalent bonds. The monofunctional (M) unit represents $R_3SiO_{1/2}$; the difunctional (D) unit represents $R_2SiO_{2/2}$; the trifunctional (T) unit represents $RSiO_{3/2}$ and results in the formation of branched linear siloxanes; and the tetrafunctional (Q) unit represents $SiO_{4/2}$ and results in the formation of crosslinked and resinous compositions. Each R typically is an organogroup.

The condensation reaction catalyst is any ingredient added to step (i) or step (ii), directly or indirectly via in situ generation thereof or carry over from a prior step, that increases rate of, or promotes, the condensation reaction of step (ii) without itself being permanently changed. The method uses the condensation reaction catalyst in a quantity that is sufficient for achieving this catalytic effect, i.e., in a catalytically effective amount. The condensation reaction catalyst may be an acid, base, or a metal salt of an organic acid. The acid may be an organic or inorganic acid. The inorganic acid may comprise an aqueous hydrogen halide such as aqueous HCl. The organic acid may comprise a carboxylic acid (e.g., acetic acid) or a metal cation salt of the carboxylic acid. The acid may be a mixture of any two or more acids such as a mixture of an inorganic and organic acid. The carboxylic acid may also be a mixture of any two or more carboxylic acids. The condensation reaction catalyst may be the base. The base may comprise anhydrous ammonia, aqueous ammonia, a Group 1 or 2 metal cation hydroxide (e.g., NaOH), an organic amine (e.g., tributylamine), an organic amine salt of a carboxylic acid, a quaternary ammonium salt. The organic amine may be a primary, secondary, tertiary, or aromatic amine. The primary amine may be methylamine, ethylamine, propylamine, hexylamine, butanolamine, or butylamine. The secondary amine may be dimethylamine, diethylamine, diethanolamine, dipropylamine, dibutylamine, dihexylamine, ethylamylamine, or propylhexylamine. The tertiary amine may be trimethylamine, triethylamine, tripropylamine, tripropanolamine, tributylamine, or methylpropylhexylamine. The aromatic amine may be pyridine, imidazole, or N-methylimidazole. The amine may be tetramethylguanidine or diazabicyclononane. The amine salt may be dodecylamine phosphate or an inorganic acid or carboxylic acid salt of any one of the preceding primary, secondary, tertiary, or aromatic amines. The quaternary ammonium salt may be tetramethylammonium acetate, methylethyldibutylammonium chloride, dioctadecyldimethylammonium chloride, or tetramethylguanidine 2-ethylhexanoate. The base may also be a mixture of any two or more of the foregoing bases.

Step (ii) gives the HO-functional polydiorganosiloxane-(MQ resin) copolymer, which is characterizable by a hydroxyl content (Si—OH content)>15,000 ppm. The hydroxyl content of the HO-functional polydiorganosiloxane-(MQ resin) copolymer may be >16,000 ppm, alternatively >18,000 ppm. A maximum hydroxyl content of the HO-functional polydiorganosiloxane-(MQ resin) copolymer may be <30,000 ppm, alternatively <25,000 ppm, alternatively <20,000 ppm. The hydroxyl content of a particular HO-functional polydiorganosiloxane-(MQ resin) copolymer may vary with the particular condensation reaction conditions such as the particular reaction temperature, reaction period, or condensation reaction catalyst employed in step (ii); with the composition, DP, or Mw of the designed polydiorganosiloxane precursor used; with molar ratios of reactants; or a combination of any two or more thereof. The HO-functional polydiorganosiloxane-(MQ resin) copolymer may lack trialkylsilyl-O— and/or alkyl end groups. The HO-functional polydiorganosiloxane-(MQ resin) copolymer may comprise a macromolecule, or a portion thereof, of formula (I): [(MQ Resin)$^1$-[polydiorganosiloxane]-Si(Alkenyl,R$^V$)-[polydiorganosiloxane]-(MQ Resin)$^2$]-(OH)$_x$ (Ia), wherein x is the average number of hydroxy groups per the macromolecule.

Generally, the hydroxyl content of the HO-functional polydiorganosiloxane-(MQ resin) copolymer as directly obtained from step (ii) is too high for optimal release-modifying performance. For example, if the hydroxyl content is too high (e.g., >18,000 ppm), RM and RC compositions comprising the HO-functional polydiorganosiloxane-(MQ resin) copolymer may exhibit undesirably low anchorage when concentration of the hydrosilylation catalyst in the curable RC composition is relatively low, e.g., for a Pt-based hydrosilylation catalyst, when concentration of Pt is greater than 0 ppm and <100 ppm. The farther below 100 ppm is the Pt concentration in the curable RC composition, the more pronounced is the beneficial effect of the curable RM composition on increasing anchorage of the cured RC composition ultimately prepared therefrom. For example, the increase in anchorage of the curable RM composition is increasingly more pronounced when Pt concentration in the curable RC composition is <75 ppm, alternatively <60 ppm, alternatively <50 ppm. The term "anchorage" means the adhesion of the cured RC composition to a substrate, such as paper, such as glassine paper. Therefore to increase anchorage, at least some, alternatively essentially all hydroxy groups of the HO-functional polydiorganosiloxane-(MQ resin) copolymer are desirably capped with a silylating agent as in step (iii), alternatively an alkylating agent, to give the capped polydiorganosiloxane-(MQ resin) copolymer.

The capped polydiorganosiloxane-(MQ resin) copolymer is a product of a process comprising the following step (iii), alternatively steps (ii) and (iii), alternatively steps (i) to (iii). Steps (i) and (ii) are as described above. Step (iii) comprises a hydroxy-capping reaction. Step (iii) comprises contacting together at least the HO-functional polydiorganosiloxane-(MQ resin) copolymer and a trihydrocarbylsilylating agent to give the capped polydiorganosiloxane-(MQ resin) copolymer.

Step (iii) may be carried out by dissolving the HO-functional polydiorganosiloxane-(MQ resin) copolymer and trihydrocarbylsilylating agent in a desired weight ratio thereof in an organic vehicle, mixing to homogeneity, and then stirring the resulting reaction mixture at a suitable reaction temperature and for a suitable reaction period to give a reaction mixture comprising the capped polydiorganosiloxane-(MQ resin) copolymer as a reaction product. The reaction temperature may be any degree of hotness or coldness sufficient to allow the reaction of step (iii) to occur under the conditions and may be, for example from 20° to 200° C., alternatively from 30° to 150° C., alternatively from 50° to 150° C., alternatively from 70° to 140° C. The reaction period may be any length of time sufficient to allow the reaction of step (iii) to occur under the conditions and may be, for example, from 30 minutes to 24 hours, alternatively from 45 minutes to 15 hours, alternatively from 1 to 10 hours. If desired, once the capping reaction has prepared the capped polydiorganosiloxane-(MQ resin) copolymer, volatiles such as water or methanol, organic vehicle, and any volatile trihydrocarbylsilylating agent or by-product thereof may be removed from the reaction mixture by any suitable means such as stripping, evaporation or distillation to give a more concentrated form of the capped polydiorganosiloxane-(MQ resin) copolymer, which may then be used directly as ingredient (a) in the curable RC composition described later.

The hydroxyl content of the capped polydiorganosiloxane-(MQ resin) copolymer is less than the hydroxyl content of the HO-functional polydiorganosiloxane-(MQ resin) copolymer. The maximum hydroxyl content of the capped polydiorganosiloxane-(MQ resin) copolymer may be <13,000 ppm, as mentioned before, especially when used in an embodiment of the curable RC composition having a Pt concentration greater than 0 ppm and <100 ppm as described earlier. Alternatively, the maximum hydroxyl content of the capped polydiorganosiloxane-(MQ resin) copolymer may be <12,000 ppm, alternatively <11,000 ppm, alternatively <10,000 ppm, alternatively <9,000 ppm, alternatively <8,000 ppm, alternatively <7,000 ppm, alternatively <6,000 ppm, alternatively <5,000 ppm. Alternatively, when concentration of Pt in the curable RC composition is from 100 to 200 ppm, the maximum hydroxyl content of the capped polydiorganosiloxane-MQ resin) is less pronounced, and then the maximum hydroxyl content of the capped polydiorganosiloxane-(MQ resin) copolymer may be <14,100 ppm, alternatively <13,100 ppm, alternatively <12,100 ppm. Theoretically the hydroxyl content of the capped polydiorganosiloxane-(MQ resin) copolymer may be 0 ppm. Typically, however, it may be difficult to perform the capping step (iii) in such a way that the hydroxyl content of the capped polydiorganosiloxane-(MQ resin) copolymer is 0 ppm. In such embodiments, therefore, the capped polydiorganosiloxane-(MQ resin) copolymer may have a minimum hydroxyl content of >0 ppm but less than any one of the aforementioned maximum hydroxyl content values. The capped polydiorganosiloxane-(MQ resin) copolymer may have a minimum hydroxyl content of 100 ppm, alternatively 1,000 ppm, alternatively 3,000 ppm. The capped polydiorganosiloxane-(MQ resin) copolymer may have a minimum hydroxyl content of 100 ppm and a maximum hydroxyl content of any one of the foregoing maximum values; alternatively a minimum hydroxyl content of 1,000 ppm and a maximum hydroxyl content of any one of the foregoing maximum values, alternatively a minimum hydroxyl content of 3,000 ppm and a maximum hydroxyl content of any one of the foregoing maximum values. For example, the hydroxyl content of the capped polydiorganosiloxane-(MQ resin) copolymer may be from alternatively from >100 to <13,000 ppm, alternatively from >100 to <12,000 ppm, alternatively from >3,000 to <13,000 ppm, alternatively from >3,000 to <12,000 ppm, alternatively from >3,000 to <11,000, alternatively from >3,000 to <10,000. Having the hydroxyl group content of the capped polydiorganosiloxane-(MQ resin) copolymer in the indicated range results in the RM composition having beneficial increased release properties and may desirably increase the compatibility of the capped polydiorganosiloxane-(MQ resin) copolymer with the other siloxane components of the cured RC composition. This compatibility of the RM composition may enable the preparation of a uniform layer of the cured RC composition. Another beneficial result is that the cured RC composition may exhibit increased release properties and/or an increased residual adhesiveness. In contrast, if the hydroxyl content of the capped polydiorganosiloxane-(MQ resin) copolymer would exceed the indicated upper limit (e.g., >15,000 ppm), such a non-invention composition would lack the combination of improved % anchorage and poor compatibility with anchorage and/or hydrosilylation reaction inhibitor additives as described elsewhere herein. Therefore, the capped polydiorganosiloxane-(MQ resin) copolymer at a given amount of anchorage has lesser amounts of Pt catalyst in the curable RC composition than the amounts of Pt catalyst would be required for use with the HO-functional polydiorganosiloxane-(MQ resin) copolymer to achieve the same given amount of anchorage. The capped polydiorganosiloxane-(MQ resin) copolymer may comprise a macromolecule, or a portion thereof, of formula (II): [(MQ Resin)$^1$-[polydiorganosiloxane]-Si(Alkenyl,R$^V$)-[polydiorganosiloxane]-(MQ Resin)$^2$]-(OSi(hydrocarbyl)$_3$)$_y$, (I), wherein y is the average number of capped hydroxy groups (—OSi(hydrocarbyl)$_3$) per the macromolecule and wherein y<x, wherein x is shown earlier in formula (Ia). Additionally or alternatively, the capped polydiorganosiloxane-(MQ resin) copolymer may be chemically compatible with anchorage additives and inhibitors of hydrosilylation. Anchorage additives are compounds that function to increase anchorage of a cured RC composition to a substrate. Examples of anchorage additives are described later herein. The capped polydiorganosiloxane-(MQ resin) copolymer may be chemically compatible with the foregoing anchorage additives. Uncapped HO-functional polydiorganosiloxane-(MQ resin) copolymers may be incompatible with such anchorage additives because undesirable hydrogen bonding may occur resulting in high viscosity, gel-like compositions that are un-coatable Inhibitors of hydrosilylation reactions are compounds that function to delay onset of, slow rate of, or prevent Si—C bond formation between a SiH functional organosiloxane and an alkenyl-functional organosiloxane. Examples of hydrosilylation reaction inhibitors are maleates such as diallyl maleate and bis(methoxymethyl)ethylmaleate. The capped polydiorganosiloxane-(MQ resin) copolymer may be chemically compatible with the foregoing hydrosilylation reaction inhibitors.

The trihydrocarbylsilylating agent may be a trialkylsilylating agent and the capped polydiorganosiloxane-(MQ resin) copolymer comprises trialkylsilyl-O— end groups ((alkyl)$_3$SiO— end groups) and has a hydroxyl content of less than 13,000 ppm, alternatively <12,000 ppm, alternatively <11,000 ppm, alternatively <10,000 ppm, alternatively <8,000 ppm. The hydroxyl content may be as low as 100 ppm, alternatively 1,000 ppm, alternatively 3,000 ppm. Theoretically, the hydroxyl content of the capped polydiorganosiloxane-(MQ resin) copolymer may be 0 ppm. The trialkylsilylating agent may be a trimethylsilylating agent and the end-capping reaction product comprises trimethylsilyl-O— end groups ((CH$_3$)$_3$Si— end groups) and the capped polydiorganosiloxane-(MQ resin) copolymer prepared therewith may have a hydroxyl content of less than 13,000 ppm, alternatively <12,000 ppm, alternatively <11,000 ppm, alternatively <10,000 ppm, alternatively <8,000 ppm. The hydroxyl content may be as low as 100 ppm, alternatively 1,000 ppm, alternatively 3,000 ppm. The trimethylsilylating agent may be trimethylsilyl chloride, trimethylsilanol, methoxytrimethylsilane, ethoxytrimethylsilane, propoxytrimethylsilane, dimethylaminotrimethylsilane, diethylaminotrimethylsilane, or a silazane compound. The silazane compound may be hexamethyldisilazane, N-methylhexamethyldisilazane, N-ethylhexamethyldisilazane, hexamethyl-N-propyldisilazane, or a mixture of any two or more thereof. Alternatively the trimethylsilylating agent may be the trimethylsilanol, alternatively the hexamethyldisilazane.

One or more additional steps may be added to the process of making the invention polydiorganosiloxane-(MQ resin) copolymers. For example, at least one step may be added before step (i), after step (iii), between steps (i) and (ii), between steps (ii) and (iii), or, when two or more steps are added, a combination of any two or more thereof. For example, a step of preparing reactant (a1) and/or a step of preparing reactant (a2) may be added before step (i). A step of curing the capped polydiorganosiloxane-(MQ resin) copolymer, or removing any organic vehicle therefrom may be added after step (iii). A step of removing volatiles may be added between steps (i) and (ii) and/or between steps (ii) and (iii). Alternatively or additionally, other extra steps may be added.

Steps (i) to (iii) may be carried out in an organic vehicle. The organic vehicle may function as a dispersing medium, and optionally as a solvent. The expression "organic vehicle" can then be replaced by the word "solvent". The organic vehicle may have a boiling point of from 30° to 150° C. at 101 kilopascals. Typically, the organic vehicle is not reactive during condensation reaction of ingredients (a1) and (a2) or curing of the curable RM or RC composition. For example the organic vehicle may lack functional groups that would react with a silanol moiety during a condensation reaction and/or may lack functional groups that would react with an SiH functional organosiloxane during a hydrosilylation reaction. Examples of organic vehicles with silanol reactive functional groups are alcohols, carboxylic acids, and carboxylic esters. The organic vehicle may lack carbon-carbon double and triple bonds. The organic vehicle may consist essentially of, alternatively consist of a saturated or aromatic organic vehicle. Examples of suitable organic vehicles are aromatic hydrocarbons such as benzene, toluene, and xylenes; aliphatic hydrocarbons such as hexane, octane, and isoparaffin; ether solvents such as diisopropyl ether and 1,4-dioxane; and mixtures of any two or more thereof. The organic vehicle may be toluene, alternatively xylene. The RM composition may further comprise the organic vehicle (e.g., xylenes).

Any ingredient other than the capped polydiorganosiloxane-(MQ resin) copolymer may be added after the capping reaction of step (iii). For example, after step (iii), the capped polydiorganosiloxane-(MQ resin) copolymer of the RM composition may be transferred to another vehicle such as a hydrosilylation reactive diluent. In contrast to the organic vehicle, the hydrosilylation reactive diluent is a material that is not removed from the invention compositions by physical separation or distillation, but is allowed to react with another ingredient in the curable RC composition so as to covalently bond to the capped polydiorganosiloxane-(MQ resin) copolymer to give a derivative thereof. Thus, the hydrosilylation reactive diluent may be removed from the curable RC composition by chemical transformation to another molecule. Examples of suitable hydrosilylation reactive diluents are compounds having an alkenyl or alkynyl group. When the hydrosilylation reactive diluent is a compound having an alkenyl group, the hydrosilylation reactive diluent may be an unsaturated hydrocarbon, alternatively an alkenyl-containing diorganosiloxane, which may be straight chain, alternatively branched chain. The unsaturated hydrocarbon may be an alkene vehicle, alternatively an alkyne vehicle. The transfer may be performed by stripping the organic vehicle from the capped polydiorganosiloxane-(MQ resin) copolymer prepared in step (iii) to give a concentrate comprising the capped polydiorganosiloxane-(MQ resin) copolymer, and diluting the concentrate with the alkene vehicle, alternatively the alkenyl-containing diorganosiloxane. The stripping and diluting steps may be performed sequentially, alternatively simultaneously (e.g., as in fractionation by distillation). The unsaturated hydrocarbon may function in the RM and curable RC compositions as a hydrosilylation reactive diluent. The unsaturated hydrocarbon may be ethylene or a $(C_3-C_{40})$alpha-olefin, e.g., a $(C_3-C_{20})$alpha-olefin, e.g., 1-tetradecene. Alternatively, the unsaturated hydrocarbon may be a branched olefin of formula $H_2C=C(R^A)_2$, wherein each $R^A$ independently is $(C_1-C_{20})$alkyl. Ingredients that are solids may be first dissolved in the organic vehicle before being added to the curable RC composition. If desired, the organic vehicle may then be removed from the resulting curable RC composition such as by evaporation, stripping or distillation.

The RM composition is a product of, and the method of manufacturing the RM composition comprises, a process comprising the step (iii), alternatively the steps (ii) and (iii), alternatively the steps (i) to (iii). Steps (i) to (iii) are as described above. The RM composition comprises the capped polydiorganosiloxane-(MQ resin) copolymer having the designed polydiorganosiloxane portion and the MQ resin portions and a hydroxyl content of less than 13,000 ppm, alternatively <12,000 ppm, alternatively <11,000 ppm, alternatively 10,000 ppm, alternatively <8,000 ppm. The hydroxyl content may be as low as 100 ppm, alternatively 1,000 ppm, alternatively 3,000 ppm. As described above, the designed polydiorganosiloxane portion of the capped polydiorganosiloxane-(MQ resin) copolymer comprises two D segments coupled to each other via a $(R^V,\text{Alkenyl})SiO_{2/2}$ unit. $R^V$ is $(C_1-C_6)$hydrocarbyl. Alkenyl is $(C_2-C_6)$alkenyl. Each of the D segments comprises, alternatively consist of, a plurality of $(R^D)_2SiO_{2/2}$ units and lack carbon-carbon double and triple bonds. Each $R^D$ independently is $(C_1-C_6)$ alkyl, $(C_3-C_6)$cycloalkyl, or phenyl.

In the reactant (a1), reactant (a2), designed polydiorganosiloxane precursor, polyorganosiloxane MQ resin, and invention polydiorganosiloxane-(MQ resin) copolymers, each of the ad rem R, $R^V$, $R^M$, and $R^D$ independently may be $(C_1-C_6)$alkyl or phenyl; alternatively methyl or phenyl, alternatively methyl. The invention polydiorganosiloxane-(MQ resin) copolymers may lack an SiH moiety.

Each $(C_1-C_6)$hydrocarbyl independently is $(C_1-C_6)$alkyl, $(C_3-C_6)$alkyl, or phenyl; alternatively $(C_1-C_6)$alkyl or phenyl; alternatively $(C_1-C_6)$alkyl; alternatively phenyl. At least one, alternatively each $(C_1-C_6)$alkyl independently is $(C_1-C_5)$alkyl, alternatively $(C_1-C_4)$alkyl, alternatively $(C_1-C_3)$alkyl, alternatively $(C_1-C_2)$alkyl, alternatively $(C_2-C_6)$alkyl, alternatively $(C_3-C_6)$alkyl, alternatively methyl, alternatively ethyl, alternatively $(C_3)$alkyl, alternatively propyl, alternatively 1-methylethyl, alternatively $(C_4)$alkyl, alternatively $(C_5)$alkyl, alternatively $(C_4)$alkyl.

At least one, alternatively each $(C_2-C_6)$alkenyl independently is $(C_2-C_5)$alkenyl, alternatively $(C_2-C_4)$alkenyl, alternatively $(C_2-C_3)$alkenyl, alternatively $(C_3-C_6)$alkenyl, alternatively $(C_4-C_6)$alkenyl, alternatively vinyl, alternatively $(C_3)$alkenyl (e.g., allyl), alternatively 1-propenyl, alternatively 2-propenyl, alternatively 3-propenyl, alternatively $(C_4)$alkenyl, alternatively $(C_5)$alkenyl, alternatively $(C_6)$alkenyl (e.g., hexenyl). The invention contemplates Alkenyl alternatively may be a $(C_7-C_{12})$alkenyl.

Each halogen atom independently may be F, Cl, Br, I; alternatively Cl, Br, or I; alternatively Cl or Br; alternatively F; alternatively Cl; alternatively Br; alternatively I.

Each organogroup independently may be a hydrocarbyl, e.g., an alkyl, alkenyl, alkynyl, cycloalkyl, aryl, or a combination thereof (e.g., alkylphenyl or phenylalkyl, e.g., benzyl). Each hydrocarbyl independently may have from 1 to 20, alternatively from 1 to 10, alternatively from 1 to 7, alternatively from 1 to 4 carbon atoms. Each hydrocarbyl independently may be unsubstituted, alternatively substituted with at least 1 substituent. Each substituent independently may be halo (e.g., fluoro, chloro, bromo, or iodo); or unsubstituted $(C_1-C_5)$alkyl, $(C_1-C_5)$alkoxy (i.e., $(C_1-C_5)$ alkyl)O—), $(C_1-C_5)$alkanoyl, or $((C_1-C_5)$alkyl$)_2$N—. Examples of substituted hydrocarbyl are fluoropropyl, 2-oxo-butan-4-yl, and dimethylaminophenyl.

Alternatively, the coupling agent may be a compound of formula $(R^V,H)Si(X)_2$, which may be used instead of $(R^V, Alkenyl)Si(X)_2$ in an alternative process for making a capped polydiorganosiloxane-(MQ resin) copolymer that is SiH functional instead the aforementioned capped polydiorganosiloxane-(MQ resin) copolymer, which is Si-Alkenyl functional. This alternative process may employ a mild protic acid catalyst in place of the condensation reaction catalyst. Examples of suitable protic acid catalysts are carboxylic acids such as acetic acid. The alternative process may use in the hydroxy capping reaction a capping agent of formula $R^M_3SiCl$, wherein $R^M$ is as defined above, instead of the trihydrocarbylsilylating agent. Other than the foregoing differences the alternative process may be essentially the same as the previously mentioned process.

The curable RC composition may comprise ingredients (a) to (d): Ingredient (a) the RM composition of the invention at a concentration of from 1 to <100 parts; Ingredient (b) an alkenyl-containing diorganosiloxane (e.g., a vinyl-containing diorganosiloxane) at a concentration of from 0 to <99 parts (i.e., when 0 parts, the alkenyl-containing diorganosiloxane is absent); Ingredient (c) an organohydrogensiloxane having SiH moieties, wherein the amount of the organohydrogensiloxane relative to the total amount of the release-modifier composition and alkenyl-containing diorganosiloxane is such that the SiH-to-alkenyl molar ratio is from 0.5 to 3.5, wherein the moles of SiH are based on the SiH of the organohydrogensiloxane and the moles of alkenyl are a total of the moles of alkenyl of the release-modifier composition plus the moles of alkenyl of the alkenyl-containing diorganosiloxane; and Ingredient (d) a hydrosilylation catalyst at a concentration of from 1 to 1,000 ppm. In some embodiments, the curable RC composition is a solventless curable RC composition, which means the curable RC composition substantially lacks an organic vehicle and an unsaturated hydrocarbon vehicle and has a dynamic viscosity of from greater than 0 to 2,000 centipoise (cP). Such embodiments advantageously provide solventless curable RC compositions that have low dynamic viscosity and yet provide increased % Anchorage and/or decreased % extractables and/or increased release force efficiency.

The ingredients (a) to (d) of curable RC composition may sum to a total greater than 100 parts. The ppm concentration of the hydrosilylation catalyst is determined relative to one million parts of the other ingredients of the curable RC composition. If the other ingredients of the curable RC composition sum to 150 parts, and the concentration of the hydrosilylation catalyst is 1,000 ppm, then the curable RC composition would have an absolute concentration of 0.150 parts hydrosilylation catalyst (i.e., 0.150 parts/150 parts=1, 000 ppm). The curable RC composition may also lack a saturated and/or aromatic hydrocarbon vehicle. The RM composition may be at a concentration of from 1 to 99 parts, alternatively from 5 to 95 parts, alternatively from 1 to 10 parts, alternatively from 10 to 50 parts, alternatively from 5 to 30 parts, alternatively from 10 to 30 parts, alternatively from 20 to 30 parts, alternatively from 50 to 90 parts, alternatively from 90 to 99 parts in the curable RC composition. The alkenyl-containing diorganosiloxane may be at a concentration of from 0 to 99 parts, alternatively 0 parts (i.e., when the alkenyl-containing diorganosiloxane is absent), alternatively from 1 to 98 parts, alternatively from 5 to 95 parts, alternatively from 50 to 70 parts, alternatively from 70 to 95 parts, alternatively from 70 to 80 parts in the curable RC composition. The concentration of the organohydrogensiloxane may be expressed as the SiH-to-alkenyl molar ratio, wherein the moles of SiH are based on the SiH of the organohydrogensiloxane and the moles of alkenyl are a total of the moles of alkenyl of the release-modifier composition plus the moles of alkenyl of the alkenyl-containing diorganosiloxane. When the alkenyl of the release-modifier composition is vinyl and the alkenyl of the alkenyl-containing diorganosiloxane is vinyl, the moles of alkenyl are a total of the moles of vinyl of the release-modifier composition plus the moles of vinyl of the vinyl-containing diorganosiloxane. The organohydrogensiloxane may be at a concentration such that the SiH-to-alkenyl molar ratio is from 0.5 to 3.0, alternatively from 1.0 to 3.5, alternatively from 1.0 to 2.8, alternatively from 1.5 to 2.8, alternatively from 1.5 to 2.0 in the curable RC composition. The hydrosilylation catalyst may be at a concentration of from 5 to 500 ppm, alternatively from 5 to 300 ppm, alternatively from 10 to 200 ppm, alternatively from 15 to 150 ppm, alternatively from 10 to 80 ppm, alternatively from 20 to 50 ppm in the curable RC composition. The dynamic viscosity of the curable RC composition may be from 1 to 1,000 cP, alternatively from 50 to 1,500 cP. The curable RC composition may be characterizable by a combination of any one of the foregoing ranges of concentrations of ingredient (a), any one of the foregoing ranges of concentrations of ingredient (b), any one of the foregoing ranges of concentrations of ingredient (c), and any one of the foregoing ranges of concentrations of ingredient (d). The curable RC composition may be characterizable by the combination of ranges of concentrations of ingredients (a) to (d) plus any one of the foregoing ranges of dynamic viscosity of the curable RC composition.

Ingredient (a), the RM composition, is any one of the RM compositions of the invention described herein.

Ingredient (b), the alkenyl-containing diorganosiloxane, may be a vinyl-containing diorganosiloxane. The alkenyl content (e.g., vinyl content) of the alkenyl-containing diorganosiloxane may be from 0.1 to 20 wt %, alternatively from 0.2 to 10.0 wt %, alternatively from 0.5 to 5.0 wt % of the total silicon-bonded organogroups in each molecule. A cure rate of the curable RC composition that is sufficient for practical applications may not be obtained when the alkenyl content is less than the indicated lower limit (e.g., <0.1 wt %), while the cured RC composition (e.g., a coating thereof on a substrate) may be characterizable as having poor or no releasability upon aging when the indicated upper limit (e.g., 20 wt %) is exceeded. The siloxane chain of the alkenyl-containing diorganosiloxane may be straight, alternatively branched. The alkenyl-containing diorganosiloxane may comprise a mixture of straight chain siloxane macromolecules and branched chain siloxane macromolecules. The alkenyl may be bonded to silicon atoms of the alkenyl-containing diorganosiloxane in molecular chain terminal position, side chain position, or some in the molecular chain terminal position and others in the side chain position. The organogroups in the alkenyl-containing diorganosiloxane may be $(C_1$-$C_6)$alkyl such as methyl, ethyl, propyl, butyl, or hexyl; aryl such as phenyl, tolyl, or xylyl; aralkyl such as benzyl or phenethyl; halogenated alkyl such as 3-chloropropyl, perfluoro$(C_1$-$C_6)$alkyl; perfluoro$(C_1$-$C_5)$alkyl-O—$(C_1$-$C_5)$alkyl, or cyanoethyl. Each of the organogroups other than the alkenyl independently may be methyl, ethyl, or phenyl; alternatively methyl or phenyl; alternatively methyl.

Examples of the alkenyl-containing diorganosiloxane are: a dimethylpolysiloxane chain-stopped at both molecular chain terminals by dimethylvinylsiloxy, a dimethylsiloxane/methylvinylsiloxane copolymer chain-stopped at both molecular chain terminals by trimethylsiloxy, a dimethylsiloxane/methylvinylsiloxane copolymer chain-stopped at both molecular chain terminals by dimethylvinylsiloxy, a dimethylsiloxane/methylvinylsiloxane copolymer chain-stopped at both molecular chain terminals by dimethylethoxysiloxy, a dimethylsiloxane/methylphenylsiloxane copolymer chain-stopped at both molecular chain terminals by dimethylvinylsiloxy, and a dimethylsiloxane/methyl(3,3,3-trifluoropropyl)siloxane copolymer chain-stopped at both molecular chain terminals by dimethylvinylsiloxy groups.

The alkenyl-containing diorganosiloxane may be a liquid or gum at ambient temperature, but may be a liquid when used for the preparation of the solventless form of the curable RC composition. The liquid alkenyl-containing diorganosiloxane may have a dynamic viscosity of from 50 to 10,000 cP, alternatively from 50 to 2,000 cP, 50 to 1,000 cP. When the alkenyl-containing diorganosiloxane is a gum at ambient temperature, it may be dissolved in an organic vehicle such as xylene or toluene.

Ingredient (c), the organohydrogensiloxane, may have at least two SiH moieties on average per molecule and organogroups. The organogroups may be $(C_1-C_6)$alkyl such as methyl, ethyl, propyl, butyl, or hexyl; aryl such as phenyl, tolyl, or xylyl; aralkyl such as benzyl or phenethyl; halogenated alkyl such as 3-chloropropyl, perfluoro$(C_1-C_6)$alkyl; perfluoro$(C_1-C_5)$alkyl-O—$(C_1-C_5)$alkyl, or cyanoethyl. At least 50 mol % of the organogroups in the organohydrogensiloxane may be $(C_1-C_6)$alkyl groups, alternatively methyl or ethyl groups, alternatively methyl groups. Any remainder of the organogroups in the organohydrogensiloxane may be phenyl or $(C_1-C_6)$alkyl groups; alternatively phenyl, methyl or ethyl; alternatively phenyl or methyl; alternatively methyl. The organohydrogensiloxane may have a dynamic viscosity at 25° C. of 1 to 1,000 mPa·s, alternatively from 5 to 500 mPa·s. Examples of the organohydrogensiloxane are a methylhydrogenpolysiloxane chain-stopped at both terminals by trimethylsiloxy, dimethylsiloxane-methylhydrogensiloxane copolymer chain-stopped at both terminals by trimethylsiloxy, dimethylsiloxane-methylhydrogensiloxane copolymer chain-stopped at both terminals by dimethylhydrogensiloxy, cyclic methylhydrogenpolysiloxane, cyclic methylhydrogensiloxane-dimethylsiloxane copolymer, tris(dimethylhydrogensiloxy)methylsilane, and tetra(dimethylhydrogensiloxy)silane.

Ingredient (c) may function as a crosslinker. The amount of crosslinker may be such that the ratio of the total amount of silicon hydride (SiH) groups to alkenyl groups in the curable RC composition is from 1.1:1 to 2.5:1, alternatively from 1.2:1 to 2:1. Typically, the crosslinker is a SiH functional polysiloxane. The SiH functional polysiloxane generally contains on average per molecule at least three SiH groups. The SiH functional polysiloxane and may have the general formula (I): $R^t_3SiO_{1/2}((CH_3)_2SiO_{2/2})_d(R^t_2SiO_{2/2})_e)SiO_{1/2}R^t_3$ (I), wherein each $R^t$ independently may be $(C_1-C_4)$alkyl group or hydrogen, d is 0 or an integer of 1 or greater, and e is an integer, and d and e are chosen such that the sum d+e is from 8 to 100. Some $R^t$ may be methyl and some $R^t$ may be hydrogen such that the SiH functional polysiloxane may contain methylhydrogensiloxane units. The SiH functional polysiloxane may be a linear poly(methylhydrogen)siloxane having trimethylsilyl or hydrogendimethylsilyl end groups, or a copolymer having methylhydrogensiloxane units and dimethylsiloxane units. Alternatively, the crosslinker may be a branched alkenyl siloxane polymer as described at column 5, line 8, to column 6, line 45, of U.S. Pat. No. 7,592,412 B2.

Ingredients (b) and (c) may be used in the curable RC composition in a relative proportion such that moles of SiH moieties of ingredient (c) ($SiH^c$) to moles of Alkenyl moieties (e.g., vinyl) of ingredient (b) ($Alkenyl^b$) is in a ($SiH^c$/Alkenyl$^b$) molar ratio of from 0.3 to 5.0, alternatively from 0.7 to 2.0. The rate of curing of the curable RC composition may tend to undesirably decline when this ($SiH^c$/Alkenyl$^b$) molar ratio is less than 0.3, and a cured RC composition coating may not form or cure too slowly compared to the present embodiment when this ($SiH^c$/Alkenyl$^b$) molar ratio is greater than 0.3. When this ($SiH^c$/Alkenyl$^b$) molar ratio is larger than 5.0, the releasability of the cured RC composition from tacky substances undesirably may decline and blocking may undesirably occur between one cured RC coating composition and an adhesive in contact therewith. In addition, a large temporal variation in the release force of the cured RC coating composition may occur to an eventual point that the practical usefulness of the cured RC coating composition may be lost.

Ingredient (d), the hydrosilylation catalyst, may be any suitable substance that may accelerate the rate of hydrosilylation curing of the curable RC composition to give the cured RC composition. The hydrosilylation catalyst may be based on a transition metal. Each metal independently be platinum, rhodium, ruthenium, palladium, osmium, or iridium, or any combination of at least two thereof. Typically, the metal is platinum, based on its high activity in hydrosilylation reactions. Typically ingredient (d) is the platinum compound. The hydrosilylation catalyst may be unsupported or disposed on a solid support (e.g., carbon, silica, or alumina). The hydrosilylation catalyst may be microencapsulated in a thermoplastic resin for increased stability during storage of the curable silicone composition comprising the hydrosilylation-curable organosiloxane before curing. When curing is desired, the microencapsulated catalyst (e.g., see U.S. Pat. No. 4,766,176 and U.S. Pat. No. 5,017,654) may be heated about the melting or softening point of the thermoplastic resin, thereby exposing the hydrosilylation catalyst to ingredients (A) and (B). The hydrosilylation catalyst may be a photoactivatable catalyst (e.g., platinum(II) β-diketonate complexes such as platinum(II) bis(2,4-pentanedionate)) for increased stability during storage of the curable silicone composition before curing. When curing is desired, the photoactivatable catalyst may be exposed to ultraviolet radiation having a wavelength of from 150 to 800 nanometers (nm), thereby activating the catalyst to the hydrosilylation reaction during curing of the curable RC composition. The hydrosilylation catalyst may be the platinum-based hydrosilylation catalyst. Examples of the platinum-based hydrosilylation catalyst are: chloroplatinic acid; alcohol solutions of chloroplatinic acid; aldehyde solutions of chloroplatinic acid; olefin complexes of chloroplatinic acid such as those in U.S. Pat. No. 3,419,593 such as the reaction product of chloroplatinic acid and 1,3-diethenyl-1,1,3,3-tetramethyldisiloxane; chloroplatinic acid/diketone complexes; platinum/alkenylsiloxane complexes such as chloroplatinic acid/divinyltetramethyldisiloxane complexes, chloroplatinic/tetramethyltetravinylcyclotetrasiloxane complexes, platinum/divinyltetramethyldisiloxane complexes, and platinum/tetramethyltetravinylcyclotetrasiloxane complexes; platinum tetrachloride; finely divided platinum; finely divided platinum supported on alumina micropowder or silica micropowder; platinum black; platinum/olefin complexes; platinum/diketone complexes; and platinum/carbonyl complexes. The hydrosilylation catalyst may be a chloroplatinic acid, a chloroplatinic acid/divinyltetramethyldisiloxane complex, a chloroplatinic acid/tetramethyltetravinylcyclotetrasiloxane complex, a platinum/divinyltetramethyldisiloxane complex, or a platinum/tetramethyltetravinylcyclotetrasiloxane complex.

The hydrosilylation catalyst of ingredient (d) may be used in an amount that is effective for catalyzing the hydrosilylation curing of the curable RC composition to give the cured RC composition. As mentioned above, the hydrosilylation catalyst may be at a minimum concentration of 1 ppm to a maximum concentration of 1,000 ppm in the curable RC composition. The minimum 1 ppm concentration of the hydrosilylation catalyst is chosen to enable the curing of the curable RC composition to proceed at an economical curing rate. The maximum 1,000 ppm concentration of the hydrosilylation catalyst is used in order to balance the rate of curing with the economic cost of the hydrosilylation catalyst, which may comprise expensive platinum metal. The invention also contemplates embodiments that use concentrations of the hydrosilylation catalyst that are lower than 1 ppm or higher than 1,000 ppm. In many embodiments, the concentration of the hydrosilylation catalyst is from 2 to 500 ppm, alternatively from 4 to 200 ppm, alternatively from 5 to 150 ppm (e.g., 25, 80 or 120 ppm).

The curable RC composition may lack an organic vehicle and hydrosilylation reactive diluent, i.e., the curable RC composition may be a "solventless" form of the curable RC composition as mentioned earlier in other words a curable RC composition free of solvent. The solventless form of the curable RC composition may be adapted to a desired dynamic viscosity for a particular application by adding a dynamic viscosity modifier to the solventless form of the curable RC composition. The dynamic viscosity modifier may be a polysiloxane such as a cyclic polysiloxane, straight-chain or branched dimethylpolysiloxane (chain-stopped at the molecular chain terminals by alkenyldimethylsiloxy, trimethylsiloxy, dimethylmonohydroxysiloxy, or dimethylmonoalkoxysiloxy), or a mixture of any two or more thereof. The dynamic viscosity modifier may have a dynamic viscosity at 25° C. of from 0.65 to 1,000 milliPascal-seconds (mPa·s). Examples of the dynamic viscosity modifier are cyclic methylpolysiloxanes having a degree of polymerization of from 3 to 7 and comprising the siloxane unit; and straight-chain dimethylpolysiloxane having a dynamic viscosity at 25° C. of 5 to 500 mPa·s, such as a straight-chain dimethylpolysiloxane chain-stopped at the molecular chain terminals by alkenyldimethylsiloxy. Another example of the dynamic viscosity modifier is alkenyldimethylsiloxy chain-stopped straight-chain dimethylpolysiloxane as represented by the formula $M^{Ra}D_pM^{Ra}$ where $M^{Ra}$ is the monofunctional alkenyldimethylsiloxy group represented by $(CH_3)_2(Ra)SiO_{1/2}$; Ra is $C_{2-8}$ alkenyl; D is the difunctional siloxane unit represented by $(CH_3)_2SiO_{2/2}$; and p is a number from 5 to 200. Ra is preferably vinyl or hexenyl and p is particularly preferably a number from 20 to 100. When the "solventless" form of the curable RC composition is employed to coat or form a film on a substrate, the dynamic viscosity of the "solventless" form of the curable RC composition may be adjusted to be from 50 to 2,000 mPa·s at 25° C.

Alternatively, the curable RC composition may further comprise the organic vehicle, i.e., the curable RC composition may be a "solvent-based" form of the curable RC composition. The organic vehicle is as described previously herein. When the "solvent-based" form of the curable RC composition is employed to coat or form a film on a substrate, the dynamic viscosity of the "solvent-based" form of the curable RC composition may be adjusted to be from 50 to 5,000 mPa·s at 25° C.

Alternatively or additionally, the RM and curable RC compositions optionally may further comprise at least one additional ingredient that is suitable for use with and/or in the compositions and distinct from the aforementioned reactants, catalysts, products and ingredients and from one another. The distinction may be of structure, function, or feature (e.g., color). For example, some embodiments of the RM and curable RC compositions independently may further comprise an effective amount of at least one of the following ingredients: hydrosilylation reaction inhibitors; stabilizers; heat resistance improvers; fillers; pigments; levelling agents; anchorage additives, which are agents that increase the adhesion to substrate; antistatic agents; defoamers; anti-mist agents; additional crosslinkers; nonreactive organopolysiloxanes; and a combination of any two or more of these optional ingredients. In embodiments of the process for applying a coating or film of the curable RC composition to a substrate, a thickener such as silica micropowder may be incorporated into the curable RC composition in order to achieve a desired thickness of the resulting coating or film of the curable RC composition on the substrate (e.g., second substrate such as a release liner). Any additional ingredient does not completely prevent the reaction or curing of the composition or functioning of the cured material. The additional ingredients are optional; each independently is present in or absent from the invention compositions. The additional ingredients are generally compatible with reaction curing of silicone compositions. There may be overlap between types or functions of ingredients because certain ingredients described herein may have more than one function. Amounts of ingredients, when present, may be chosen and varied under the circumstances, and typically independently may be from 1 to 20 wt % of the relevant composition.

For example, the curable RC composition may further comprise, alternatively consist essentially of, alternatively consist of ingredient (e) a hydrosilylation reaction inhibitor for inhibiting cure of the curable RC composition during storage of the curable RC composition. Alternatively, the curable RC composition may further comprise, alternatively consist essentially of, alternatively consist of the anchorage additive (ingredient (f)). For example, the curable RC composition may comprise, alternatively consist essentially of, alternatively consist of ingredients (a) to (d); alternatively consist of ingredients (a) to (e); alternatively ingredients (a) to (f); alternatively ingredients (a) to (d) and (f); alternatively any one of the foregoing combinations of ingredients (a) to (d), and/or (e), and/or (f), and an organic vehicle; alternatively any one of the foregoing combinations of ingredients (a) to (d), and/or (e), and/or (f), and a hydrosilylation reactive diluent; alternatively any one of the foregoing combinations of ingredients (a) to (d), and (e) or (f), and an organic vehicle; alternatively any one of the foregoing combinations of ingredients (a) to (f) and an organic vehicle; alternatively any one of the foregoing combinations of ingredients (a) to (d), and (e) or (f), and a hydrosilylation reactive diluent; alternatively any one of the foregoing combinations of ingredients (a) to (f) and a hydrosilylation reactive diluent.

Ingredient (e), the hydrosilylation reaction inhibitor, typically is included in the curable RC composition when the hydrosilylation reaction catalyst is a platinum-based compound and typically may be omitted from the curable RC composition when the hydrosilylation reaction catalyst is the microencapsulated (heat activated) or photoactivatable hydrosilylation reaction catalyst. The hydrosilylation reaction inhibitor may at a suitable concentration in the curable RC composition that enables the curable RC composition to be stored for a desired period of time under storage conditions such at 40° C. or below (e.g., from 0° to 30° C.), while allowing the curable RC composition to be cured to give the cured RC composition when the curable RC composition is heated to a reaction temperature that is greater than room temperature (i.e., >25° C.). The hydrosilylation reaction inhibitor may be used as a bath extender to extend the working lifetime of a bath comprising the curable RC composition. Examples of the hydrosilylation reaction inhibitor are acetylenic compounds, ene-yne compounds, maleate compounds, organonitrogen compounds, organophosphorus compounds, and oxime compounds and can be specifically exemplified by alkynyl alcohols such as 3-methyl-1-butyn-3-ol, 3,5-dimethyl-1-hexyn-3-ol, 3-methyl-1-pentyn-3-ol, 1-ethynyl-1-cyclohexanol, and phenylbutynol; and by 3-methyl-3-penten-1-yne and 3,5-dimethyl-1-hexyn-3-ene; and by diallyl maleate and bis (methoxymethyl)ethylmaleate; benzotriazole, and methylvinylcyclosiloxane. The hydrosilylation reaction inhibitor, when present, may be in the curable RC composition at a concentration expressed as a wt % based on the total weight of ingredients (a) and (b), wherein such a concentration may be from >0 to 10 wt %, alternatively from 0.05 to 1.5 wt %, alternatively from 0.10 to 0.30 wt %.

Ingredient (f), the anchorage additive, is optional. Typically, the anchorage additive is the silicon-based anchorage additive. Suitable silicon-based anchorage additives include a hydrocarbyloxysilane, a combination of an alkoxysilane and a hydroxy-functional polyorganosiloxane, an aminofunctional silane, or a combination of any two or more thereof. The hydrocarbyloxysilane may be an alkoxysilane.

For example, the anchorage additive may comprise a silane having the formula $R^{19}_rR^{20}_sSi(OR^{21})_{4-(r+s)}$ where each $R^{19}$ is independently a monovalent organic group having at least 3 carbon atoms; $R^{20}$ contains at least one Si—C-substituent wherein the substituent has an adhesion-promoting group, such as amino, epoxy, mercapto or acrylate groups; each $R^{21}$ is independently a saturated hydrocarbon group; subscript r has a value ranging from 0 to 2; subscript s is either 1 or 2; and the sum of (r+s) is not greater than 3. Saturated hydrocarbon groups for $R^{21}$ may be an alkyl group of 1 to 4 carbon atoms, alternatively alkyl of 1 or 2 carbon atoms. $R^{21}$ may be methyl, ethyl, propyl, or butyl; alternatively $R^{21}$ may be methyl. Alternatively, the anchorage additive may comprise a partial condensate of the above silane. Alternatively, the anchorage additive may comprise a combination of an alkoxysilane and a hydroxy-functional polyorganosiloxane.

Alternatively, the anchorage additive may comprise an unsaturated or epoxy-functional compound. The anchorage additive may comprise an unsaturated or epoxy-functional alkoxysilane. Examples of suitable epoxy-functional alkoxysilane type anchorage additives include 3-glycidoxypropyltrimethoxysilane, 3-glycidoxypropyltriethoxysilane, (epoxycyclohexyl)ethyldimethoxysilane, (epoxycyclohexyl) ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

Alternatively, the anchorage additive may comprise an epoxy-functional organosiloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. For example, the anchorage additive is exemplified by a mixture of 3-glycidoxypropyltrimethoxysilane and a reaction product of hydroxy-terminated methylvinylsiloxane (i.e., hydroxy-terminated poly(methyl, vinyl)siloxane) with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the anchorage additive may comprise an epoxy-functional organocyclosiloxane. The epoxy-functional organocyclosiloxane comprises one or more, alternatively two or more epoxy groups and at least one type of organogroup such as the alkyl, alkenyl, alkynyl, aryl, or organoheteryl. For example, the epoxy-functional organocyclosiloxane may be an epoxy-functional D3 to D6 diorganocyclosiloxane.

Alternatively, the anchorage additive may comprise an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and a combination thereof.

The concentration of anchorage additive, when present, may be from 0.1 to 10 wt %, alternatively from 0.5 to 7 wt %, alternatively from 0.7 to 5 wt %, all based on weight of the curable RC composition. Alternatively, the concentration of anchorage additive, when present, may be from 1 to 10 wt %, alternatively from 2 to 9 wt %, alternatively from 3 to 8 wt %, all based on weight of the curable RC composition.

The RM and curable RC compositions independently may further comprise one or more additional ingredients such as reaction by-products, residual trihydrocarbylsilylating agent, and optionally any one or more optional ingredient. For example, the curable RC composition may further comprise a non-invention RM composition to give a blended curable RC composition having the invention RM composition and the non-invention RM composition. The invention RM composition may be used in the blended curable RC composition to enhance performance of the non-invention RM composition. The enhanced performance may comprise decreasing the amount of extractables left after curing the blended curable RC composition compared to the amount of extractables left after curing a non-invention RC composition lacking the invention RM composition, increasing release force efficiency, or both.

The method of manufacturing the curable RC composition comprises the step of: mixing the ingredients (a) to (d); and optionally ingredient (e), the hydrosilylation reaction inhibitor, and/or any one or more of the other optional ingredients described above, together, and/or any other optional ingredient, to give the curable release-coating composition.

Typically mechanics of the methods of manufacturing the RM composition and curable RC composition independently comprise combining by contacting and mixing ingredients with equipment suitable for the mixing. The equipment is not specifically restricted and may be, e.g., agitated batch kettles for relatively high flowability (low dynamic viscosity) compositions, a ribbon blender, solution blender, co-kneader, twin-rotor mixer, Banbury-type mixer, or extruder. The method may employ continuous compounding equipment, e.g., extruders such as extruders, twin screw extruders (e.g., Baker Perkins sigma blade mixer or high shear Turello mixer), may be used for preparing compositions containing relatively high amounts of particulates. The composition may be prepared in batch, semi-batch, semi-continuous, or continuous process. General methods of combining are known, e.g., US 2009/0291238; US 2008/0300358.

The compositions independently may be prepared as a one part or multiple part composition. The one-part composition may be prepared by combining all ingredients by any convenient means, such as mixing, e.g., as described for the method. All mixing steps or just a final mixing step may be performed under conditions that minimize or avoid curing. The composition may be stored in a container until ready for use. The multiple part (e.g., 2 part) composition may be prepared where ingredients (c) and (d) are stored in different parts. For example, ingredients (a), (c) and, optionally (b) are stored in one part and ingredients (d) and optionally (b), is stored in a separate part, and the parts are combined (e.g., by mixing) shortly before use of the composition. Ingredient (b) may be divided and stored in both parts.

Once prepared the composition may be used immediately or stored for any practical period, e.g., $\geq 1$ hour, alternatively $\geq 1$ day, alternatively $\geq 1$ week, alternatively $\geq 30$ days, alternatively $\geq 300$ days, alternatively $\geq 2$ years before use. The composition may be stored in a container that protects the composition from exposure to curing conditions (e.g., heat). The storage may be at a suitable temperature (e.g., $\leq 40°$ C., e.g., 25° C.) and, if desired, under an inert gas atmosphere (e.g., $N_2$ or Ar gas). After such storage, the composition may, if desired, be cured directly, or first agitated and then cured, to give the cured material, which would exhibit the increased release force.

The cured RC composition comprises a product of hydrosilylation curing any one of the curable RC compositions to give the cured RC composition. The curable RC composition may be applied as a coating or film on a substrate, and then the resulting coating or film of the applied curable RC composition may be heated to give the cured RC composition as a cured coating or film. When desired, curing of the curable RC composition may be initiated or accelerated by exposing it to a curing condition such as heat to give the cured RC composition. The curing may be preceded by removing any volatile ingredient (e.g., boiling point <120° C. at 101 kilopascals) from the curable RC composition. Suitable curing temperatures for heating the curable RC composition to give the cured RC composition are generally 50 to 230° C., but curing temperatures above 230° C. may be used if the RC compositions are coated on a substrate that has good heat resistance at such curing temperatures. The curable RC composition may be cured in an oven set to the curing temperature. When a curing oven is used, the temperature of the curable RC composition in the oven may be less than or equal to the oven temperature. The particular temperature of the curable RC composition in the oven may depend upon one or more factors such as how long the curable RC composition is kept in the oven (residence time), the initial temperature of the curable RC composition right before being placed in the oven (starting temperature), and the heating capacity of the oven (e.g., weight of the oven versus weight of the curable RC composition). There are no particular limitations on the method of heating the curable RC composition to give the cured RC composition. For example, the heating method may comprise passing the curable RC composition (e.g., disposed on a substrate) through a convection oven, alternatively through a long heating oven, alternatively exposing the curable RC composition to thermal radiation such as from an infrared lamp or halogen lamp. Alternatively, the curing of the curable RC composition to give the cured RC composition may be carried out by a method comprising a combination of heating and exposing the curable RC composition to ultraviolet radiation. The curable RC composition may be cured in an oven set to an oven temperature of from 50 to 200° C., in which case the heating time may be from 1 second to 5 minutes.

The curable RM composition and curable/cured RC compositions may be useful, inter alia, as a modifier, including a release modifier; a coating including a release coating; adhesive; filler; film; and sealant. The curable RC composition may be used to prepare the coated article.

The coated article comprises a substrate and a layer of the cured RC composition in operative contact therewith. The substrate may be a sheet-form substrate. The substrate may be any material suitable for supporting the cured RC composition. Typically the substrate is not an organosiloxane. The substrate may be or comprise paper, a glassine paper, cardboard, a clay-coated paper, a polyolefin-laminated paper (e.g., a polyethylene-laminated paper), a plastic film obtained from synthetic organic resins (e.g., polyester, polypropylene, polyethylene, polyvinyl chloride, polytetrafluoroethylene, or polyimide), a fabric, a textile, a foam, one or more synthetic fibres, metal foil (e.g., Cu foil), or any combination of two or more thereof. The combination may be a textile comprising one or more fibres, a board comprising a composite of a plurality of particles (e.g., wooden particle board), or a laminate comprising two or more laminated sheets. The layer of the cured RC composition may function as a release liner. The substrate may be a solid material formed into any natural or manmade shape such as a sheet, which may be monolithic or perforated; fibres, which may be woven or nonwoven; irregular or regular; or particles. The substrate may be the first substrate, alternatively the second substrate, of the composite article.

The method of manufacturing the coated article comprises the steps of: depositing a layer of the curable RC composition on the substrate to give a curable coated substrate comprising a layer of the curable RC composition disposed on the substrate, and curing the layer of the curable RC composition on the substrate to give the coated article. The layer of the curable RC composition may be disposed on or applied to an exterior or interior surface portion of the substrate by any suitable means such as by brushing, calendaring, dipping, drawing down, (co)extruding, injection, rolling, spraying, or wiping, to give the coated article having the curable RC composition applied therein or thereon. The coating method may comprise roll coating, gravure coating, wire doctor coating, air knife coating, or dip coating. Desirable quantities of the curable RC composition to be applied are amounts that yield from 0.01 to 100 grams of the coating of the curable RC composition per square meter surface area of the portion of the substrate receiving the coating (i.e., 0.01 to 100 g/m$^2$). The coating may have a thickness of from 0.1 to 100 microns (μm). The entire surface of the substrate may be coated or only a portion of the surface of the substrate may be coated with the curable RC composition. When only the portion of the surface has the coating, that portion may be a single location, alternatively two or more different locations thereon as in applying the curable RC composition at uniformly spaced apart locations on the surface of the substrate to aid release of the cured RC composition prepared by curing the curable RC composition from the substrate.

The composite article comprises a first substrate (e.g., a component), an adhesive, the cured RC composition, and a second substrate, wherein sequentially the first substrate is in adhering operative contact with the adhesive, the adhesive is in releasable operative contact with the cured RC composition, and the cured RC composition is in adhering operative contact with the second substrate, wherein the first substrate and adhesive together are separable from the cured RC composition without separating the first substrate and adhesive from each other. The first substrate and adhesive together may be separable from the cured RC composition without separating the cured RC composition and second substrate from each other. The first substrate may be the same as the second substrate; alternatively the first substrate may be different than the second substrate in at least one of shape, size, material, temperature, color, optical transparency, and surface chemistry. The composite article may further comprise a third substrate, which may be the same as or different than the first and second substrates.

The method of preparing the composite article may comprise the steps of: manufacturing a coated article comprising the cured release-coating composition in adhering operative contact with the second substrate (e.g., a release liner), disposing the adhesive in adhering operative contact with the first substrate (e.g., a component) and in releasable operative contact with the cured RC composition of the coated article so as to sandwich the adhesive between the first substrate and the cured release-coating composition to give the composite article. The disposing of the adhesive in adhering operative contact with the first substrate and in releasable operative contact with the cured RC composition may be done simultaneously, alternatively sequentially in any order. The disposing or coating step may be done as described above for preparing the coated article. Alternatively, the composite article may be prepared by other methods.

The coated article and the composite article independently may be used in a wide variety of industries including, but not limited to, paper, office supplies, medicine, health, and personal care supplies, electronic and electrical supplies, and building supplies. The composite article may be used alone or may be used as a component in a larger structure. The articles may be hollow, semi-solid, or solid, and may be utilized in horizontal, angled, or vertical positions, in both load-bearing and non load-bearing applications. The articles may also be used in both indoor environments and outdoor environments. In various embodiments of the present invention, the articles may include labels, automotive decals, laminated articles, single and double sides tapes, transfer films, theft protection and anti-counterfeit devices, re-closeable fasteners, patches, bandages, transdermal drug delivery patches, temporary fixatives, adhesively bonded articles, structural tapes, fabric repair tapes, utility tapes, electrical and thermally insulating tapes, heat conductive tapes, thermal interface materials, electrically conductive tapes, and combinations thereof. The articles may include an adhesive label, e.g., an adhesive label is commercially available under the trade name of POST-IT (3M Company, Minneapolis, Minn., USA). The composite article may include a series of adhesive labels in a common package. The composite article may include a tape. An example of such a tape is commercially available under the trade name of SCOTCH. The composite article may also be any shape including, but not limited to, square, rectangular, and circular. An appropriate shape of the composite article may be readily chosen based on necessity, aesthetic qualities, and desire.

The substrate may have any thickness. The substrate typically has a thickness of less than 10 mm. If the composite article is used in office supplies, such as in adhesive labels, the substrate may have thicknesses of approximately from 0.1 to 0.2 mm.

Typically, the substrate includes a top face and a bottom face, which are spaced apart from each other by the thickness of the substrate. The top and bottom faces of any substrate may be substantially smooth, textured, corrugated, microtextured, or a combination of any two or more thereof. The surface characteristics of the top and bottom faces of any substrate may be readily chosen based on intended application and aesthetic considerations.

The composite article may include a pressure-sensitive adhesive (PSA) disposed on the substrate. The term 'pressure-sensitive adhesive' and the acronym 'PSA' are used interchangeably herein. The PSA may be in direct contact with the substrate, i.e., the PSA may physically touch the substrate, e.g. disposed directly on top of the substrate with no other materials or layers in between. Alternatively, the PSA may be in indirect contact with the substrate, i.e., the PSA may not physically touch the substrate but instead may be spaced apart from the substrate by one or more intermediate materials or layers, which would be disposed in between the substrate and the PSA. The PSA may be disposed on the top face of the substrate, on the bottom face of the substrate, or on both the top and bottom faces of the substrate. The PSA may be disposed on the substrate as a continuous film. Alternatively, the PSA may be disposed on the substrate at discrete points, which may be arranged in a pattern. The pattern may be random, alternatively uniform, e.g., geometric.

Various PSAs and adhesives may be used for a tacky or PSA material with the cured RC composition yielded by curing of the curable RC composition. Examples of such adhesives are acrylic resin PSAs, rubber-based PSAs, silicone PSAs, acrylic resin adhesives, synthetic rubber-based adhesives, silicone adhesives, epoxy resin adhesives, and polyurethane adhesives. Other examples of the tacky material are asphalt, tacky food products such as mochi (Japanese rice cake), glues and pastes, and birdlime.

Some Test Methods that may be used to characterize the invention compositions follow.

Cured Coated Release Liner Preparation Method: a test sample of a curable RC composition was coated using a 3 roll gravure coating head with a coating weight ranging from 0.88 to 1.04 g/m$^2$ on 60 g/m$^2$ glassine paper from Ahlstrom to give a coated paper. The resulting coated paper was then placed on a continuous moving web and passed through a heated oven, set at 180° C., for 3.0 seconds to cure the curable RC composition and give a cured coated release liner comprising the cured RC composition as a coating directly on the glassine paper.

Dynamic Viscosity Test Method: dynamic viscosity of a test sample of a polyorganosiloxane composition is determined at 25° C. with a BROOKFIELD Viscometer Model DV-II using spindle LV #2 (Brookfield Engineering, Middleboro, Mass., USA).

Extractables Test Method: as described in Example 1 of U.S. Pat. No. 7,592,412 B2 (col. 8, lines 40 to 46), a test sample of the cured coated release liner, prepared above, was immersed in a solution of methyl isobutyl ketone to extract any siloxane which had not been crosslinked. After an hour the test sample was removed from the solvent, dried, and reweighed. The % extractables equals the % weight loss and is a measure of degree of cure. 100% extractables means no cure; 0% extractables means complete cure; and from >0% to <100% extractables means a partial cure, wherein the closer the % extractables is to 0%, the greater the extent of cure. In the present invention, the % extractables using this test method may be <6.90%, alternatively <6.70%, alternatively <6.50%, alternatively <6.30%, alternatively <6.00%, <5%, alternatively from <4%, alternatively <3%, alternatively <2%. The % extractables may be as low as 0%, alternatively >0.1%, alternatively >1% or 2%, alternatively >3%, alternatively >4%, alternatively >5%, alternatively >6.00%.

Hydroxyl Group Content Test Method: Silicon-bonded hydroxyl content was determined using Fourier Transform Infrared (FTIR) spectroscopy. Test samples were prepared by casting a solution of a test polyorganosiloxane composition (e.g., the curable RM composition or ingredient of the curable RC composition) onto an appropriate release liner (e.g., a fluorocarbon or fluorosilicone based polymer, e.g., 3M SCOTCHPAK 1022; 3M Company), and removing the solvent to form a film of the test polyorganosiloxane composition. The film was transferred to a salt disc for FTIR analysis. FTIR spectra were measured using a Nicolet Magna-IR 560 spectrometer. Background scans and spectral scans were completed with the following settings: absorbance mode, 16 scans, weak apodization, and 4 cm$^{-1}$ resolution. The film was scanned, and the $A_1/(A_2*100)$ peak ratio calculated. The $A_1$ area corresponds to the peak for the dimeric elongation vibration of the O—H bond from the silanol group. The $A_2$ area corresponds to the area for an overtone peak of the deformation of the hydrogen of a polydimethylsiloxane (PDMS) methyl group. The parts per million (ppm) silanol was calculated using the equation: Silanol (ppm)=19426.6*[$A_1/(A_2*100)$]−1029.2. This relationship between peak area and silanol concentration in ppm for siloxanes is described in U.S. Pat. No. 6,337,086 B1. Silanol concentration in ppm may be readily converted to weight percent (wt %) wherein 10,000 ppm=1.0 wt %.

Laminate Preparation and Test Method: The cured coated release liner, prepared above, was coated with Acronal V210 adhesive at a coating weight of from 18.6 to 19.6 grams/meter$^2$ to give a laminate sequentially comprising the Acronal V210 adhesive, cured RC composition coating, and glassine paper. The laminate was heated for 9 seconds in an oven set at 43° C., then placed on a continuous moving web and passed through a heated oven, set at 104° C., for 9 seconds to cure the Acronal V210 adhesive and give a cured laminate.

Percent Anchorage Test Method: A test sample of the cured coated release liner, prepared above, was rubbed against a piece of felt under 1 kg weight. After eight passes along an 18 inch (46 cm) felt, the test sample was reweighed. The % anchorage is the % weight remaining after the rub test and is a measure of adhesion of the cured RC composition to the glassine paper substrate. 100% Anchorage means no loss of cured RC composition; 0% Anchorage means complete loss of cured RC composition; >0% to <100% Anchorage means a partial loss of cured RC composition, wherein the closer the % Anchorage is to 100%, the greater the extent of anchorage. In the present invention, the % anchorage may be determined with glassine paper substrate as a reference test. Using such a reference test, the present invention may have a % anchorage of from 90% to 100%, alternatively from 91% to <100%, alternatively from 92% to <99%. The % Anchorage may be >90.1%, alternatively >90.5%, alternatively >91%, alternatively >94%, alternatively >95% alternatively >96%.

Percent Non-volatile Content (% NVC) Test Method: % NVC is determined by placing a weighed amount of from 2 to 4 grams (g) of a test sample (before heating) in an aluminum foil dish, and heating sample for 1 hour in an air-circulating oven set at 150° C. The resulting heated test sample is then cooled to room temperature and reweighed to determine a weight of non-volatiles remaining after heating. The % NVC is calculated as: (weight of the sample after heating/weight of sample before heating)×100.

Release Force Test Method: A test sample of cured laminate, as prepared above, is aged at 25° C. and 50% relative humidity for 7 days to give an aged laminate, and the mechanical peel force required to delaminate the aged laminate is measured. FTM 3 and FTM 4 are used for low and high speed peeling respectively with a 180 degree peel angle. FTM 3 is a low speed release force test method and FTMs 4 are high speed release force test methods. The delamination comprises separating the cured adhesive layer from the cured coated release liner. In the present invention, the release force may be determined for comparison purposes using the loading of the curable RM composition of 30 wt % with FTM 3-Release Force at 0.3 m/min with Acronal V210 as a reference test. Using such a 30 wt % loading and the FTM 3-Release Force reference test, the release force may be <15 grams per 2.54 centimeters (g/2.54 cm), alternatively <12 g/2.54 cm, alternatively <11 g/2.54 cm, alternatively <10 g/2.54 cm. The release force efficiency may be as low as >0.1 g/2.54 cm, alternatively >1 g/2.54 cm, alternatively >5 g/2.54 cm. The FTM 3-Release at 0.3 m/min with Acronal V210 may be >10.5 g/2.54 cm, alternatively >11.0 g/2.54 cm, alternatively >12.0 g/2.54 cm, alternatively >12.3 g/2.54 cm, alternatively >12.6 g/2.54 cm, alternatively >12.9 g/2.54 cm, alternatively >13.0 g/2.54 cm, alternatively >13.6.0 g/2.54 cm.

Weight Average Molecular Weight ($M_w$) Test Method: $M_w$ was determined by Gel Permeation Chromatography (GPC) and expressed in grams per mole (g/mol). A test sample of a polydiorganosiloxane polymer is prepared in toluene and analyzed against polystyrene standards using refractive index detection. A test sample of a polyorganosiloxane resin polymer (e.g., a MQ resin) is prepared in tetrahydrofuran and analyzed against polystyrene standards using refractive index detection.

Materials used in the Comparative and/or Invention Examples:

Polymer 1: di(HO-endblocked) polydimethylsiloxane with $M_w$ 44,800 g/mol.

Polymer 2: di(HO-endblocked) polydimethylsiloxane with $M_w$ 89,000 g/mol.

Polymer 3: di(HO-endblocked) polydimethylsiloxane with $M_w$ 129,000 g/mol.

Polymer 4: dimethylvinylsiloxy terminated, branched polydimethylsiloxane with dynamic viscosity of 350 cP.

Polymer 5: dimethylvinylsiloxy terminated, branched polydimethylsiloxane with dynamic viscosity of 100 cP.

Polymer 6: polydimethyl methylhydrogensiloxane with a dynamic viscosity of 25 cP.

Additive 1: Methylvinyl Bis(N-ethylacetamido) Silane.

Additive 2: Epoxy-functional polydimethyl methylvinylsiloxane anchorage additive. HMDZ: hexamethyldisilazane.

Resin 1: polyorganosiloxane MQ resin solvated in xylene at 71% non-volatile content; the resin has $M_w$ of 24,000 g/mol.

Resin 2: polyorganosiloxane MQ resin solvated in xylene at 73% non-volatile content; the resin has $M_w$ of 22,000 g/mol.

Resin 3: polyorganosiloxane MQ resin solvated in xylene at 80% non-volatile content; the resin has $M_w$ of 20,000 g/mol.

Catalyst 1: tetramethyldivinyldisiloxane complex with Pt as a reaction product of a reaction of chloroplatinic acid and divinyltetramethylsiloxane.

Acronal V210 is a water-based acrylic emulsion adhesive purchased from BASF Corporation, Florham Park, N.J., USA.

1-Ethynyl-1-cyclohexanol is a hydrosilylation reaction inhibitor purchased from Sigma Aldrich Corporation, St. Louis, Mo., USA.

Polymers 1 to 3 are examples of reactant (a1). Polymers 4 to 6 are examples of ingredients (b) and/or hydrosilylation reactive diluents. Polymer 6 is an example of ingredient (c). Additive 1 is an example of reactant (a2).

Comparative Examples: non-invention examples that should not be interpreted as being prior art.

Comparative Example (CE) 1 preparation of non-invention solventless curable RM composition (no D vinyl content and high Si—OH content): Added 346.82 g of Resin 2, 108.0 g of Polymer 1, and 145.18 g of xylene to a 2-Liter glass equipped with a bottom discharge, thermometer, nitrogen inlet, Dean-Starke trap, water-cooled condenser, a stirring paddle, and a heating mantle. Under continuous mixing and a nitrogen purge, heated contents of the reactor to 115° C. Then bubbled anhydrous ammonia through the reaction mixture. As the mixture started to condense, removed water as an azeotrope in the Dean-Starke trap. Continued the reaction for 2 hours, then stopped the addition of ammonia. When the reaction was complete, stripped 100 grams of xylenes from the mixture. Discontinued heating, and allowed the mixture to cool to room temperature before draining it from the reactor. Measured a final silanol level at 15,744 ppm. Blended the drained mixture with Polymer 5 in a ratio that upon removal of the xylenes, Polymer 5 would be 75% w/w of the final RM composition. Heated the blend up to 150° C. under reduced pressure to remove volatile species to give a comparative solventless curable RM composition of CE1. The final RM composition of CE1 has not been subjected to a hydroxyl capping reaction. The final RM composition was clear and had a dynamic viscosity of 557 cP.

Comparative Example 2 preparation of non-invention solventless curable RM composition (no D vinyl; low Si—OH content): Replicated the procedure of Comparative Example 1 except after stopping the addition of ammonia, added 25.4 g of HMDZ to the reactor, and allowed the resulting mixture to react at 115° C. until the level of silanol was decreased to an acceptable level. The final RM composition of CE2 is a product of a hydroxyl capping reaction; measured a final silanol level at 7,057 ppm instead of 15,744 ppm. When the reaction was complete, stripped 100 grams of xylenes and residual HMDZ from the mixture. Blended the drained mixture with Polymer 5 in a ratio that upon removal of the xylenes and HMDZ, Polymer 5 would be 75% w/w of the final RM composition. Heated the blend up to 150° C. under reduced pressure to remove volatile species to give the solventless RM composition of CE2. The final RM composition of CE2 was clear and had a dynamic viscosity of 570 cP.

Comparative Examples (A) to (C): prepared a control non-invention curable RC composition CE(A) that lacks any curable RM composition. Prepared non-invention curable RC compositions CE(B) to CE(C) from the non-invention release modifier compositions of CE1 to CE2, respectively, by blending together the relevant one of the release modifier compositions; Polymer 4; Polymer 7; Catalyst 1; and 1-ethynylcyclohexanol to give the comparative curable RC compositions of CE(B) to CE(C), respectively. Amounts in grams of ingredients of comparative curable RC compositions of CE(A) to CE(C); loading of the comparative curable RM composition in wt % based on total weight of Polymer 4, comparative curable RM composition, and Polymer 6; SiH to vinyl molar ratios; % extractables; % anchorage; and release force as indicated by FTM 3-Release at 0.3 m/min, FTM 4-Release at 10 m/min, FTM 4-Release at 100 m/min, and FTM 4-Release at 300 m/min, all with Acronal V210, all FTM expressed in g/2.54 cm, are listed below in Table 1.

TABLE 1

| non-invention curable release coating compositions: | | | |
|---|---|---|---|
| Amounts of Ingredients | CE (A) | CE (B) | CE (C) |
| Polymer 4 (g) | 943.81 | 638.31 | 638.31 |
| Comparative Ex. (No.) | 0.00 | 300.00/30.3 | 300.00/30.3 |
| (g)/loading (wt %) | (control) | (CE1) | (CE2) |
| Polymer 6 (g) | 46.57 | 52.07 | 52.07 |
| Catalyst 1 (g)/(ppm Pt) | 9.62/(50) | 9.62/(50) | 9.62/(50) |
| 1-Ethynyl-Cyclohexanol Level | 0.25% | 0.25% | 0.25% |
| SiH:Vi molar ratio | 1.7 | 1.7 | 1.7 |
| % Extractables | 2.70 | 6.75 | 7.00 |
| % Anchorage | 98.40 | 5.10 | 89.9 |
| FTM 3-Release at 0.3 m/min with Acronal V210 (g/2.54 cm) | 4.5 | 24.3 | 9.0 |
| FTM 4-Release at 10 m/min | 9.78 | 37.1 | 18.8 |
| FTM 4-Release at 100 m/min | 23.8 | 69.0 | 32.6 |
| FTM 4-Release at 300 m/min | 34.3 | 75.8 | 35.2 |

The data in Table 1 indicate the comparative examples do not possess a combination of % Extractables <7.00%, % Anchorage >90.1%, and release force as indicated by FTM 3-Release at 0.3 m/min with Acronal V210>10.0 g/2.54 cm.

The invention is further illustrated by, and each composition/method may be any combinations of features and limitations of, the non-limiting examples thereof that follow. The concentrations of ingredients in the compositions/formulations of the examples are determined from the weights of ingredients added unless noted otherwise.

Example (Ex.) 1: preparation of solventless curable RM composition (designed 0.15 mol % D vinyl, low silanol). Added 108.0 g of Polymer 2 and 140.39 g of xylenes to a 2-Liter glass equipped with a bottom discharge, thermometer, nitrogen gas inlet, Dean-Starke trap, water-cooled condenser, a stirring paddle, and a heating mantle. After mixing thoroughly, added 0.54 g of Additive 1. Stirred overnight at ambient conditions under a nitrogen purge to give prepolymer. Then, added 351.61 g of Resin 3, and mixed reactor contents until homogeneous. Under continuous mixing and a nitrogen purge, heated reactor contents to 115° C. Bubbled anhydrous ammonia through the heated reaction mixture. As the mixture started to condense, removed water as an azeotrope. Continued reaction for 2 hours then stopped the addition of ammonia. Removed an in-process sample, and measured the initial silanol content at 18,744 ppm. Then, added 25.4 g of HMDZ to the reactor, and allowed the mixture to react at 115° C. until trimethylsilyl capping of Si—OH groups decreased the silanol content to an acceptable level (<15,000 ppm). Final silanol level was 10,369 ppm. When the reaction was complete, stripped 100 g of xylenes and residual HMDZ from the mixture. Stopped heating, and allowed the mixture to cool to room temperature, before draining it from the reactor. Blended the discharged reaction mixture with Polymer 5 in a ratio that upon removal of the xylenes carrier solvent, Polymer 5 would be 75% w/w of the final curable RM composition. Heated this blend up to 150° C. under reduced pressure to remove volatile species, and allowed residual material to cool to give the solventless curable RM composition of Example 1. The Example 1 composition was clear and had a dynamic viscosity of 829 cP.

Example 2: preparation of solventless curable RM composition (designed 0.15 mol % D vinyl, low silanol). Replicated the procedure of Example 1 except used Polymer 1 instead of the Polymer 2; measured initial silanol content of an in-process sample at 16,274 ppm instead of the 18,744 ppm; measured a final silanol level at 10,424 ppm instead of the 10,369 ppm. The resulting solventless curable RM composition of Example 2 was clear and had a dynamic viscosity of 640 cP.

Example 3: preparation of solventless curable RM composition (designed 0.15 mol % D vinyl, low silanol). Replicated the procedure of Example 1 except used 146.13 g xylenes instead of 140.39 g of xylenes; used 345.87 grams of Resin 1 instead of the 351.61 g of Resin 3; measured initial silanol content of an in-process sample at 15,173 ppm instead of the 18,744 ppm; measured a final silanol level at 11,111 ppm instead of the 10,369 ppm. The resulting solventless curable RM composition of Example 3 was clear and had a dynamic viscosity of 755 cP.

Example 4: preparation of solventless curable RM composition (designed 0.15 mol % D vinyl, low silanol). Replicated the procedure of Example 1 except used Polymer 1 instead of the Polymer 2; used 146.13 g xylenes instead of 140.39 g of xylenes; used 345.87 grams of Resin 1 instead of the 351.61 g of Resin 3; measured initial silanol content of an in-process sample at 18,150 ppm instead of the 18,744 ppm; measured a final silanol level at 11,537 ppm instead of the 10,369 ppm. The resulting solventless curable RM composition of Example 4 was clear and had a dynamic viscosity of 557 cP.

Example 5: preparation of solventless curable RM composition (designed 0.15 mol % D vinyl, low silanol). Replicated the procedure of Example 1 except used 144.0 g of Polymer 2 instead of 108.0 g of Polymer 2; used 185.02 g xylenes instead of 140.39 g of xylenes; used 0.72 g of Additive 1 instead of 0.54 g of Additive 1; used 261.25 grams of Resin 3 instead of the 351.61 g of Resin 3; did not measure initial silanol content of an in-process sample; measured a final silanol level at 9,660 ppm instead of the 10,369 ppm. The resulting solventless curable RM composition of Example 3 was clear and had a dynamic viscosity of 1,408 cP.

Example 6: preparation of solventless curable RM composition (designed 0.06 mol % D vinyl, low silanol). Replicated the procedure of Example 1 except used 108.0 g of Polymer 3 instead of 108.0 g of Polymer 2; used 0.202 g of Additive 1 instead of 0.54 g of Additive 1; measured initial silanol content of an in-process sample at 15,685 ppm instead of 18,744 ppm; and measured a final silanol level at 11,537 ppm instead of the 10,369 ppm. The resulting solventless curable RM composition of Example 6 was clear and had a dynamic viscosity of 726 cP.

Example 7 (prophetic): preparation of solventless curable RM composition. Will replicate the procedure of Example 1 except this procedure will add 50.8 g of HMDZ in two 25.4 g batches spaced apart in time and allow the mixture to react at 115° C. until trimethylsilyl capping of Si—OH groups decreases the silanol content to a final silanol level at from 4,000 to 6,000 ppm instead of the 10,369 ppm. The resulting solventless curable RM composition of Example 7 is expected to be clear and have a useful dynamic viscosity.

Examples A to F: prepared invention curable RC compositions from the solventless curable RM compositions of Examples 1 to 6, respectively, by blending the relevant one of the solventless curable RM compositions of Examples 1 to 6, respectively; Polymer 4; Polymer 6; Catalyst 1; and 1-ethynylcyclohexanol to give the curable release coating compositions of Examples A to F, respectively. Amounts in grams of ingredients of Ex. A to F; loading of the curable RM composition in wt % based on total weight of the curable RM composition, Polymer 4, and Polymer 6; SiH to vinyl molar ratios; % extractables; % anchorage; and release force as indicated by FTM 3-Release at 0.3 m/min, FTM 4-Release at 10 m/min, FTM 4-Release at 100 m/min, and FTM 4-Release at 300 m/min, all with Acronal V210, all FTM expressed in g/2.54 cm, are listed below in Table 2.

TABLE 2 curable release coating compositions of Examples A to F:

| Ingredients | Ex. A | Ex. B | Ex. C | Ex. D | EX. E | EX. F |
|---|---|---|---|---|---|---|
| Polymer 4 (g) | 638.31 | 638.31 | 638.31 | 638.31 | 638.31 | 638.1 |
| Solventless curable RM composition (Example No.) (g)/loading (wt %) | 300 (1)/30.3 | 300 (2)/30.3 | 300 (3)/30.3 | 300 (4)/30.3 | 300 (5)/30.3 | 300 (6)/30.3 |
| Polymer 6 (g) | 52.07 | 52.07 | 52.07 | 52.07 | 52.07 | 52.07 |
| Catalyst 1 (g)/(ppm Pt) | 9.62/(50) | 9.62/(50) | 9.62/(50) | 9.62/(50) | 9.62/(50) | 9.62/(50) |
| 1-EthynylCyclohexanol Level | 0.25% | 0.25% | 0.25% | 0.25% | 0.25% | 0.25% |
| SiH:Vi molar ratio | 1.7 | 1.7 | 1.7 | 1.7 | 1.7 | 1.7 |
| % Extractables | 6.82 | 6.7 | 6.42 | 6.29 | 4.81 | 6.63 |
| % Anchorage | 96.6 | 94.4 | 96.7 | 94.9 | 94.2 | 90.6 |
| FTM 3-Release at 0.3 m/min with Acronal V210 (g/2.54 cm) | 12.96 | 11.5 | 12.61 | 12.32 | 10.7 | 14.00 |
| FTM 4-Release at 10 m/min | 9.97 | N/p | 24.84 | 26.01 | 21.4 | 20.20 |

TABLE 2-continued curable release coating compositions of Examples A to F:

| Ingredients | Ex. A | Ex. B | Ex. C | Ex. D | EX. E | EX. F |
|---|---|---|---|---|---|---|
| FTM 4-Release at 100 m/min | 39.91 | N/p | 46.84 | 42.27 | 38.5 | 34.30 |
| FTM 4-Release at 300 m/min | 43.63 | N/p | 51.17 | 51.54 | 41.0 | 36.90 |

N/p means not present.

The data in Table 2 indicate that the curable RM composition of the present invention enhances performance of the invention curable and cured RC compositions prepared therefrom. The curable RM compositions may prepare the curable and cured RC compositions that possess desirable combinations of % Extractables <7.00%, % Anchorage >90.1%, and release force as indicated by FTM 3-Release at 0.3 m/min with Acronal V210>10.0 g/2.54 cm. Release force as indicated by FTM 4-Release at 10 m/min, FTM 4-Release at 100 m/min, and FTM 4-Release at 300 m/min are also desirable.

Examples (G) and (H): Blended the curable RC composition of Ex. C with Additive 2 to give curable RC composition of Ex. G. Blended the curable RC composition of Ex. C with bis-(methoxymethyl)ethyl maleate to give curable RC composition of Ex. H.

In some release coating applications, use of additives in curable RC formulations is necessary to increase the anchorage of a resulting cured RC coating to a given substrate. Often when a filmic organic polymer such as a polypropylene or polyester film is used as the substrate, the curable RC formulations require the use of a so-called anchorage additive to enhance the adhesion of a resulting cured RC formulation to the film. Non-invention curable RC compositions, which are based on non-invention curable RM compositions that do not have sufficiently low silanol, undesirably interact with such anchorage additives to produce a non-invention cured RC formulation as an un-coatable, gel-like material. In contrast, the invention curable RM compositions have low silanol content and are compatible with such anchorage additives. This performance benefit of the invention is illustrated by comparing the visual characteristics of the anchorage additive-containing formulations of Comparative Examples CE(D) and CE(E) with that of the anchorage additive-containing formulation of invention Ex. G based on the data reported later in Table 3.

Other variations in curable RC formulations include use of different types of hydrosilylation reaction inhibitors. One type of hydrosilylation reaction inhibitor is a maleate derivative such as bis-(methoxymethyl)ethyl maleate. When bis-(methoxymethyl)ethyl maleate is used in curable RC compositions that have been prepared from non-invention curable RM compositions having a final silanol content that is too high, a resulting cured RC formulation is produced that is an un-coatable, gel-like material. In contrast, the invention curable RM compositions have low silanol content and compatibility with maleate based hydrosilylation reaction inhibitors. This is an additional unexpected benefit that will allow flexibility in formulations and not limit the use of specific hydrosilylation reaction inhibitors in end-use applications. This performance benefit of the invention is illustrated by comparing the visual characteristics of the hydrosilylation reaction inhibitor-containing formulation of Comparative Example CE(F) with that of the hydrosilylation reaction inhibitor-containing formulation of Ex. H based on the data reported below in Table 3

TABLE 3

Curable RC compositions with problem-prone additives

| Curable RC Formulation | CE(D) | Ex. G | CE(E) | CE(F) | Ex. H |
|---|---|---|---|---|---|
| CE(C) (g) | 10.0 | 0 | 0 | 5.0 | 0 |
| Ex. C (g) | 0 | 10.0 | 0 | 0 | 5.0 |
| CE(B) (g) | 0 | 0 | 10.0 | 0 | 0 |
| Additive 2 (g) | 0.1 | 0.1 | 0.1 | 0 | 0 |
| Bis-(methoxymethyl)ethyl maleate (g) | 0 | 0 | 0 | 0.1 | 0.1 |
| Final Silanol Content (ppm) of the curable RM composition (ex. no.) | 7,057 (CE2) | 11,111 (Ex. 3) | 15,744 (CE1) | 7,057 (CE2) | 11,111 (Ex. 3) |
| Observation of cured RC formulation | Slight Haze | Slight Haze | Uncoatable Gel-like material | Slight Haze | Slight Haze |

Example I (prophetic): prepare an invention curable RC composition from the solventless curable RM composition of Example 7. Replicate the procedure of Example A except this procedure will use the solventless curable RM composition of Example 7 instead of Example 1 to give the curable release coating compositions of Example I.

The below claims are incorporated by reference here as correspondingly numbered aspects except where "claim and "claims" are rewritten as "aspect" and "aspects." The invention includes such resulting numbered aspects 1 to 16.

What is claimed is:

1. A release-modifier composition having a hydroxyl content of less than 13,000 parts per million (ppm) and comprising a capped polydiorganosiloxane-(MQ resin) copolymer comprising a macromolecule having an MQ resin portion covalently bonded to a polydiorganosiloxane portion;

wherein the polydiorganosiloxane portion comprises two D segments coupled to each other via a ($R^V$,Alkenyl)SiO$_{2/2}$ unit;

wherein the D segments are free of carbon-carbon double and triple bonds;

wherein the D segments independently are two or more ($R^D$)$_2$SiO$_{2/2}$ units; and wherein the macromolecule is a product of a process comprising the following steps:

(i) contacting together at least reactants (a1) and (a2):

(a1) a di(HO-endblocked)-polydiorganosiloxane polymer having a degree of polymerization (DP) of from 300 to 2,000 and lacking carbon-carbon double and triple bonds;

wherein the di(HO-endblocked)-polydiorganosiloxane polymer comprises $HO(R^M)_2SiO_{1/2}$ end-units (M units) having hydroxy end-groups and a plurality of $(R^D)_2SiO_{2/2}$ units (D units), wherein each $R^M$ and $R^D$ independently is $(C_1\text{-}C_6)$alkyl, $(C_3\text{-}C_6)$cycloalkyl, or phenyl; and (a2) an alkenyl-containing coupling agent of formula $(R^V,\text{Alkenyl})Si(X)_2$, wherein $R^V$ is $(C_1\text{-}C_6)$hydrocarbyl, Alkenyl is $(C_2\text{-}C_6)$alkenyl, and each X independently is a condensation reaction leaving group;

wherein the contacting gives a polydiorganosiloxane precursor;

(ii) contacting together at least the polydiorganosiloxane precursor and a polyorganosiloxane MQ resin in contact with a condensation reaction catalyst, wherein the polyorganosiloxane MQ resin comprises M and Q units, to give a HO-functional polydiorganosiloxane-(MQ resin) copolymer having a hydroxyl content (Si—OH content) greater than 15,000 ppm; and (iii) contacting together at least the HO-functional polydiorganosiloxane-(MQ resin) copolymer and a trihydrocarbylsilylating agent to give the capped polydiorganosiloxane-(MQ resin) copolymer having a hydroxyl content of less than 13,000 ppm;

wherein the hydroxyl content of the capped polydiorganosiloxane-(MQ resin) copolymer is less than the hydroxyl content of the HO-functional polydiorganosiloxane-(MQ resin) copolymer.

2. The release-modifier composition of claim 1, wherein each Alkenyl is vinyl and the polydiorganosiloxane precursor has a degree of polymerization (DP) of from 500 to 4,400 and a vinyl group content of from 0.01 to 10 mole percent.

3. The release-modifier composition of claim 2, wherein: (i) the vinyl content of the polydiorganosiloxane precursor is from 0.01 to 0.094 mole percent; or (ii) wherein the vinyl content of the polydiorganosiloxane precursor is from 0.105 to 10 mole percent; or (iii) wherein the vinyl content of the polydiorganosiloxane precursor is from 0.16 to 1.0 mole percent.

4. The release-modifier composition of claim 1, wherein the polydiorganosiloxane precursor has a degree of polymerization (DP) of from 580 to 2,700.

5. The release-modifier composition of claim 1, wherein the polyorganosiloxane MQ resin comprises a total silicon-hydroxy group (Si—OH) content of from 1.0 to 3.0 weight percent.

6. The release-modifier composition of claim 1, wherein the condensation reaction catalyst comprises an acid, base, or a metal salt of an organic acid.

7. The release-modifier composition of claim 1, wherein the trihydrocarbylsilylating agent is a trialkylsilylating agent and the capped polydiorganosiloxane-(MQ resin) copolymer comprises trialkylsilyl-O— end groups ((alkyl)$_3$SiO— end groups) and has a hydroxyl content of less than 13,000 ppm; or wherein the trihydrocarbylsilylating agent is trimethylsilyl chloride or hexamethyldisilazane and the capped polydiorganosiloxane-(MQ resin) copolymer comprises trimethylsilyl-O— end groups (($CH_3$)$_3$SiO— end groups) and has a hydroxyl content of less than 13,000 ppm.

8. The release-modifier composition of claim 1, wherein each of $R^V$, $R^M$, and $R^D$ independently is $(C_1\text{-}C_6)$alkyl or phenyl.

9. The release-modifier composition of claim 1, further comprising an organic vehicle being free of both carbon-carbon double and triple bonds; or further comprising a vinyl-containing diorganosiloxane; or further comprising an unsaturated hydrocarbon.

10. A curable release-coating composition comprising ingredients (a) to (d):

(a) the release-modifier composition of claim 1 at a concentration of from 1 to <100 parts;

(b) an alkenyl-containing diorganosiloxane at a concentration of from 0 to <99 parts;

(c) an organohydrogensiloxane having SiH moieties, wherein the amount of the organohydrogensiloxane relative to the total amount of the release-modifier composition and alkenyl-containing diorganosiloxane is such that the SiH-to-alkenyl molar ratio is from 0.5 to 3.5, wherein the moles of SiH are based on the SiH of the organohydrogensiloxane and the moles of alkenyl are a total of the moles of alkenyl of the release-modifier composition plus the moles of alkenyl of the alkenyl-containing diorganosiloxane; and (d) a hydrosilylation catalyst at a concentration of from 1 to 1,000 parts per million;

wherein the curable release-coating composition is substantially free of an organic vehicle and an unsaturated hydrocarbon vehicle and has a dynamic viscosity of from greater than 0 to 2,000 centipoise.

11. The curable release-coating composition of claim 10, wherein the alkenyl of the alkenyl-containing diorganosiloxane is vinyl; or wherein the hydrosilylation catalyst comprises platinum at a concentration <100 ppm; or wherein the curable release-coating composition further comprises an anchorage additive, hydrosilylation reaction inhibitor, or anchorage additive and hydrosilylation reaction inhibitor; or wherein the alkenyl of the alkenyl-containing diorganosiloxane is vinyl, and the hydrosilylation catalyst comprises platinum at a concentration <100 ppm; and wherein the curable release-coating composition further comprises an anchorage additive, hydrosilylation reaction inhibitor, or both.

12. A cured release-coating composition comprising a product of hydrosilylation curing the curable release-coating composition of claim 10 to give the cured release-coating composition.

13. The cured release-coating composition of claim 12, having a combination of percent extractables less than 7.00%; percent anchorage greater than 90.1%; and release force as indicated by FTM 3-Release at 0.3 meter per minute with a water-based acrylic emulsion adhesive >10.0 grams per 2.54 centimeters, when prepared from a curable release coating composition having a 30 weight percent loading of the curable release modifier composition based on total weight of the ingredients (a) to (c) of the curable release coating composition.

14. A coated article comprising a substrate and a layer of the cured release-coating composition of claim 12 in operative contact therewith.

15. A composite article comprising a first substrate, an adhesive, the cured release-coating composition of claim 12, and a second substrate, wherein sequentially the first substrate is in adhering operative contact with the adhesive, the adhesive is in releasable operative contact with the cured release-coating composition, and the cured release-coating composition is in adhering operative contact with the second substrate, wherein the first substrate and adhesive together are separable from the cured release-coating composition without separating the first substrate and adhesive from each other.

16. A kit comprising the composite article of claim 15 and instructions for using the composite article.

17. A method of manufacturing the release-modifier composition of claim 1, the method comprising the steps:

(i) contacting together at least reactants (a1) and (a2):
(a1) a di(HO-endblocked)-polydiorganosiloxane polymer having a degree of polymerization (DP) of from 300 to 2,000 and being free of carbon-carbon double and triple bonds;
   wherein the di(HO-endblocked)-polydiorganosiloxane polymer comprises $HO(R^M)_2SiO_{1/2}$ end-units (M units) having hydroxy end-groups and a plurality of $(R^D)_2SiO_{2/2}$ units (D units), wherein each $R^M$ and $R^D$ independently is $(C_1-C_6)$alkyl, $(C_3-C_6)$cycloalkyl, or phenyl; and
(a2) an alkenyl-containing coupling agent of formula $(R^V,Alkenyl)Si(X)_2$, wherein $R^V$ is $(C_1-C_6)$hydrocarbyl, Alkenyl is $(C_2-C_6)$alkenyl, and each X independently is a condensation reaction leaving group;
   wherein the contacting gives a polydiorganosiloxane precursor;
(ii) contacting together at least the polydiorganosiloxane precursor and a polyorganosiloxane MQ resin in contact with a condensation reaction catalyst, wherein the polyorganosiloxane MQ resin comprises M and Q units and has a total silicon-hydroxy group (Si—OH) content of from X to Y weight percent, to give a HO-functional polydiorganosiloxane-(MQ resin) copolymer having a hydroxyl content (Si—OH content) greater than 15,000 ppm; and
(iii) contacting together at least the HO-functional polydiorganosiloxane-(MQ resin) copolymer and a trihydrocarbylsilylating agent to give the capped polydiorganosiloxane-(MQ resin) copolymer having a hydroxyl content of less than 13,000 ppm;
   wherein the hydroxyl content of the capped polydiorganosiloxane-(MQ resin) copolymer is less than the hydroxyl content of the HO-functional polydiorganosiloxane-(MQ resin) copolymer.

* * * * *